US 12,030,818 B2

(12) United States Patent
Prest et al.

(10) Patent No.: US 12,030,818 B2
(45) Date of Patent: Jul. 9, 2024

(54) ELECTRONIC DEVICES INCLUDING GLASS CERAMIC COMPONENTS

(71) Applicant: Apple Inc., Cupertino, CA (US)

(72) Inventors: Christopher D. Prest, San Francisco, CA (US); Matthew S. Rogers, San Jose, CA (US); Que Anh S. Nguyen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 125 days.

(21) Appl. No.: 17/401,194

(22) Filed: Aug. 12, 2021

(65) Prior Publication Data

US 2022/0117094 A1 Apr. 14, 2022

Related U.S. Application Data

(60) Provisional application No. 63/090,375, filed on Oct. 12, 2020.

(51) Int. Cl.
*H05K 5/00* (2006.01)
*C04B 35/119* (2006.01)
*C04B 35/46* (2006.01)

(52) U.S. Cl.
CPC ............ *C04B 35/46* (2013.01); *C04B 35/119* (2013.01)

(58) Field of Classification Search
None
See application file for complete search history.

(56) References Cited

U.S. PATENT DOCUMENTS

| 9,846,473 | B1* | 12/2017 | Kalscheur ............. G01J 5/0025 |
| 2013/0113706 | A1 | 5/2013 | Park et al. |
| 2018/0048815 | A1* | 2/2018 | Kim ........................ H04N 23/90 |
| 2018/0210118 | A1* | 7/2018 | Gollier .............. G02F 1/133524 |
| 2018/0339938 | A1* | 11/2018 | Bellman ............... C03C 17/245 |
| 2019/0169060 | A1 | 6/2019 | Jones et al. |
| 2019/0252771 | A1* | 8/2019 | Yong ...................... H01Q 21/22 |
| 2020/0006842 | A1* | 1/2020 | Zhu ........................ H01Q 1/241 |
| 2020/0017398 | A1 | 1/2020 | Click et al. |
| 2020/0095159 | A1 | 3/2020 | Marshall et al. |
| 2020/0148591 | A1 | 5/2020 | Andrews et al. |
| 2020/0231491 | A1 | 7/2020 | Beall et al. |
| 2021/0361233 | A1 | 11/2021 | Wilson et al. |
| 2022/0009823 | A1 | 1/2022 | Dejneka et al. |

FOREIGN PATENT DOCUMENTS

WO    WO2019051408    3/2019

* cited by examiner

*Primary Examiner* — Anthony J Frost
(74) *Attorney, Agent, or Firm* — Brownstein Hyatt Farber Schreck, LLP

(57) ABSTRACT

Glass ceramic components for electronic devices are disclosed, as are components including a glass ceramic material. A cover member including a glass ceramic material may be positioned over one or more device components such as an optical module or a component of a wireless communication or charging system. The cover member may have optical properties, electrical properties, magnetic properties, and/or mechanical properties compatible with the requirements of the one or more device components.

20 Claims, 14 Drawing Sheets

ELECTRONIC DEVICES INCLUDING GLASS CERAMIC COMPONENTS

CROSS-REFERENCE TO RELATED APPLICATION(S)

This application is a nonprovisional application of and claims the benefit of U.S. Provisional Patent Application No. 63/090,375, filed Oct. 12, 2020 and titled "Electronic Devices Including Glass Ceramic Components," the disclosure of which is hereby incorporated herein by reference its entirety.

FIELD

The described embodiments relate generally to components for electronic devices that include a glass ceramic material. More particularly, the present embodiments relate to glass ceramic enclosure components.

BACKGROUND

Many modern day portable electronic devices include a display, one or more cameras, and various optical sensors that are integrated into the device. Typically, the display and at least some of the cameras and optical sensors are positioned below a glass or plastic cover sheet. Embodiments described herein are directed to electronic device enclosures that include glass ceramic components and that may have advantages as compared to some traditional electronic device enclosures.

SUMMARY

Embodiments described herein relate generally to components for electronic devices that include a glass ceramic material. A component including the glass ceramic material may be an enclosure component of the electronic device, such as a cover member. In some embodiments, the component is a glass ceramic component.

The glass ceramic material may be configured to have mechanical properties which provide resistance to both breakage and scratches. For example, the glass ceramic material may be strong and tough enough so that it does not break when the electronic device is dropped. In some cases, the glass ceramic material is tougher than typical glass materials used for electronic device enclosures. The mechanical properties may include one or more of hardness, elastic modulus, fracture toughness, or impact toughness.

In some cases, a cover member including a glass ceramic material may be configured to have optical properties suitable for use over one or more components of the electronic device. For example, a glass ceramic cover member may have optical properties suitable for use over a sensing array of the electronic device. The sensing array may include multiple optical modules, such as a combination of sensor modules and camera modules. At least some of the optical modules may be configured to operate over different wavelength ranges, such as a visible wavelength range and an infrared (IR) wavelength range. The glass ceramic material of the cover member may have optical properties suitable for use with these different wavelength ranges. The glass ceramic material may also have optical properties suitable for use over a display. The optical properties may include one or more of a transmission value, a haze value, or a color value.

Alternately or additionally, a cover member including a glass ceramic material may be configured to have electrical and/or magnetic properties suitable for use over other components of the electronic device. For example, a glass ceramic cover member may be configured to have dielectric properties suitable for use over a component of a wireless communication system. In addition, a glass ceramic cover member may be configured to have magnetic properties suitable for use over a component of a wireless charging system. For example, the glass ceramic cover member may be substantially non-magnetic.

The disclosure provides an electronic device comprising an enclosure. The enclosure comprises an enclosure component defining a side surface of the enclosure and a front cover assembly coupled to the enclosure component and comprising a front cover member formed from a first glass ceramic material, the front cover member having greater than or equal to 80% transmission for visible light and a haze value less than 1%. The enclosure further comprises a rear cover assembly coupled to the enclosure component and comprising a rear cover member formed from a second glass ceramic material, the second glass ceramic material having a dielectric constant less than 30. The electronic device further comprises a display positioned below the front cover assembly, a front-facing camera array positioned below the front cover assembly and along a side of the display, and a transceiver component of a wireless communication system positioned below the rear cover assembly.

The disclosure further provides an electronic device comprising a display, a front-facing sensor assembly, and an enclosure. The front-facing sensor assembly comprises an emitter module configured to emit an optical signal over an infrared range and a receiver module configured to detect a reflection of the optical signal. The enclosure comprises an enclosure component and a front cover assembly coupled to the enclosure component and comprising a glass ceramic cover member positioned over the display and the sensor assembly, the glass ceramic cover member having a haze value less than 0.5% and a greater than or equal to 85% transmission over the infrared range. The enclosure also comprises a rear cover assembly including a cover member comprising a translucent portion. In some cases, the translucent portion may extend substantially over an entirety of the cover member of the rear cover assembly.

In addition, the disclosure provides an electronic device comprising a display and an enclosure comprising an enclosure component defining a side surface of the electronic device and a cover assembly defining a front surface of the electronic device. The cover assembly comprising a cover member positioned over the display, formed from a glass ceramic material, and having greater than or equal to 85% transmission for visible light, a haze value less than 0.5%, and a color described by an L* value of 90 or more, an a* value having a magnitude less than 0.5, and a b* value having a magnitude less than 1.

BRIEF DESCRIPTION OF THE DRAWINGS

The disclosure will be readily understood by the following detailed description in conjunction with the accompanying drawings, wherein like reference numerals designate like elements.

Figure 1A:
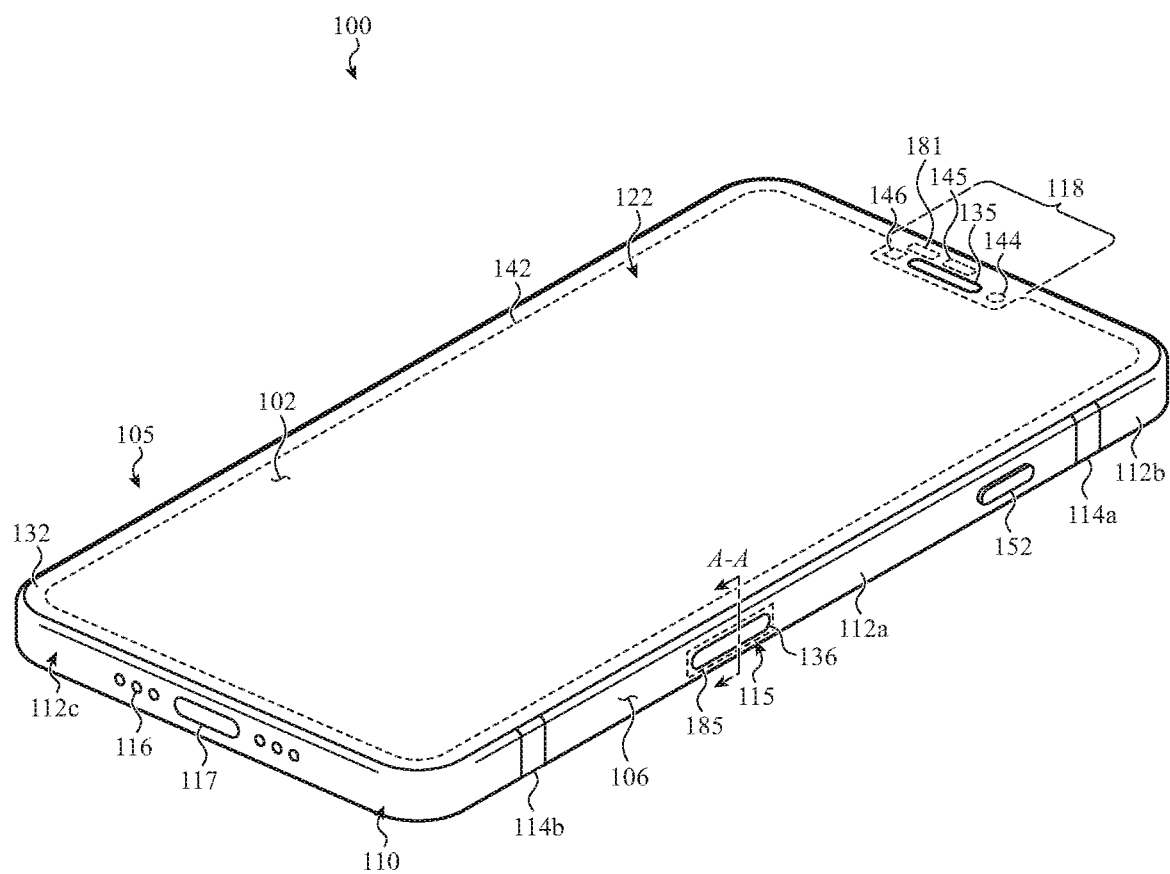
FIGS. 1A and 1B show views of an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates generally to components for electronic devices that include a glass ceramic material. A component including the glass ceramic material may be a component of the enclosure of the electronic device, such as a cover member. In some embodiments, the component is formed from the glass ceramic material and may be referred to as a glass ceramic component. The disclosure also relates to enclosures including these components and electronic devices including these enclosures.

The glass ceramic material may be configured to have mechanical properties which provide scratch and impact resistance to the enclosure. For example, the glass ceramic material may be both strong and tough. In some cases, the glass ceramic material is tougher than typical glass materials used for electronic device enclosures. In addition, the glass ceramic material may be hard enough to resist scratching. The mechanical properties may include one or more of hardness, elastic modulus, fracture toughness, or impact toughness. As referred to herein, a glass ceramic material comprises one or more crystalline phases (e.g., crystals) formed by crystallization of a (precursor) glass material. These crystalline phases can contribute to the favorable mechanical properties of the glass ceramic material.

In some cases, a cover member including or formed from a glass ceramic material may be configured to have optical properties compatible with the requirements of one or more components of the electronic device. For example, the cover member may have optical properties suitable for use over a sensing array of the electronic device. The sensing array may include multiple optical modules including, for example, a combination of sensor modules and/or camera modules. At least some of the optical modules may be configured to operate over different wavelength ranges, such as a visible wavelength range and an infrared (IR) wavelength range. For example, the optical modules may include a visible (light) camera, a visible (light) sensor module, an IR camera module, and/or an IR sensor module. The glass ceramic material of the cover member may have optical properties suitable for use with these different wavelength ranges. The glass ceramic material may also have optical properties suitable for use over a display. The optical properties may include one or more of a transmission value, a haze value, or a color value. In some embodiments, the cover member may be substantially transparent, translucent, opaque, or combinations thereof.

Alternately or additionally, a cover member including or formed from glass ceramic material may be configured to have electrical and/or magnetic properties suitable for use over other components of the electronic device. For example, the cover member may be configured to have dielectric properties suitable for use over a component of a wireless communication system. In addition, the cover member may be configured to have magnetic properties suitable for use over a component of a wireless charging system. For example, the cover member may be substantially non-magnetic.

In some embodiments, the electronic device enclosure includes a cover member comprising a glass ceramic material. In some cases, the cover member may be formed from the glass ceramic material and may be a glass ceramic cover member. The cover member may be positioned along a front, a rear, or a side of the electronic device. As previously discussed, the cover member may be configured to have optical properties, electrical properties, and/or magnetic properties compatible with one or more components of the electronic device.

In additional embodiments, the electronic device enclosure includes two cover members and at least one of the cover members comprises a glass ceramic material. The other cover member comprises a glass material, a glass ceramic material, or a combination thereof. The cover member comprising the glass ceramic material may be a front cover member, a rear cover member, or both. In some examples, one cover member is formed from a glass ceramic material and the other cover member is formed from a glass material.

Figure 6:
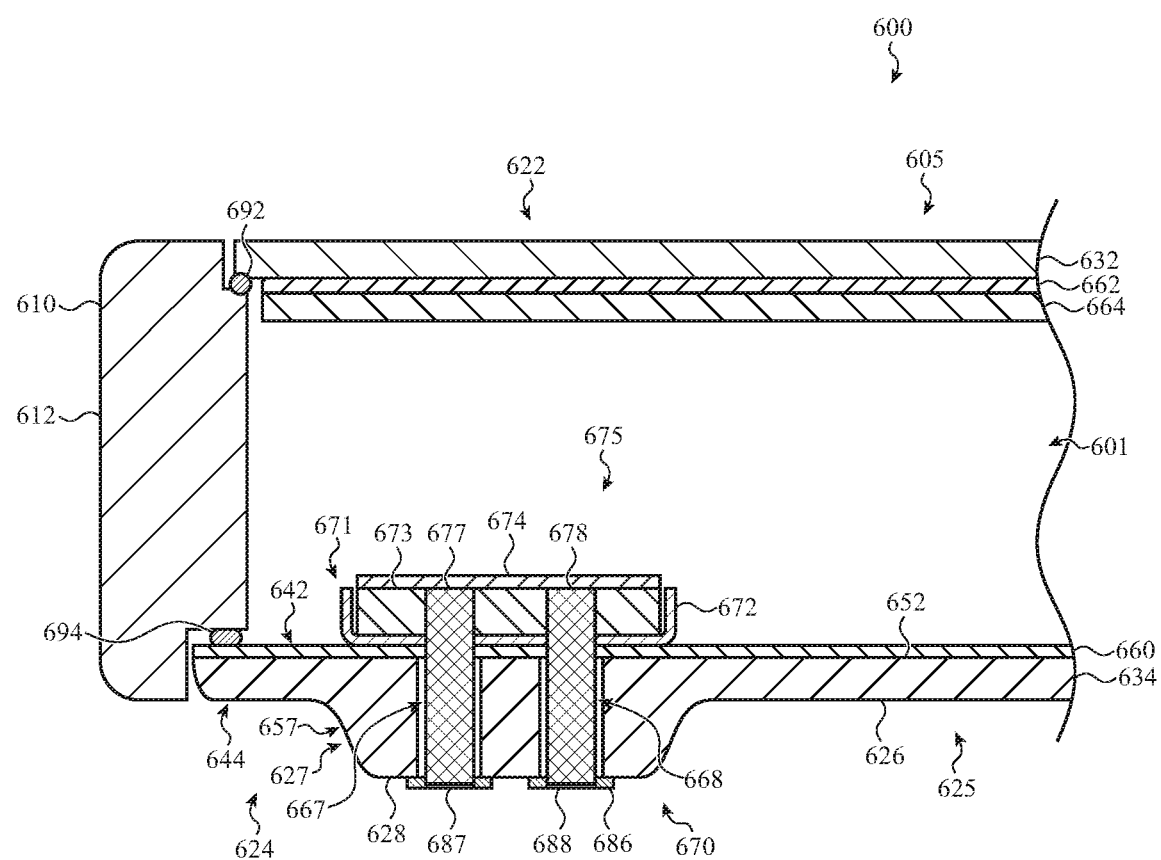
FIG. 6 shows an example cross-sectional view of a rear-facing sensing array of an electronic device.
Figure 7:
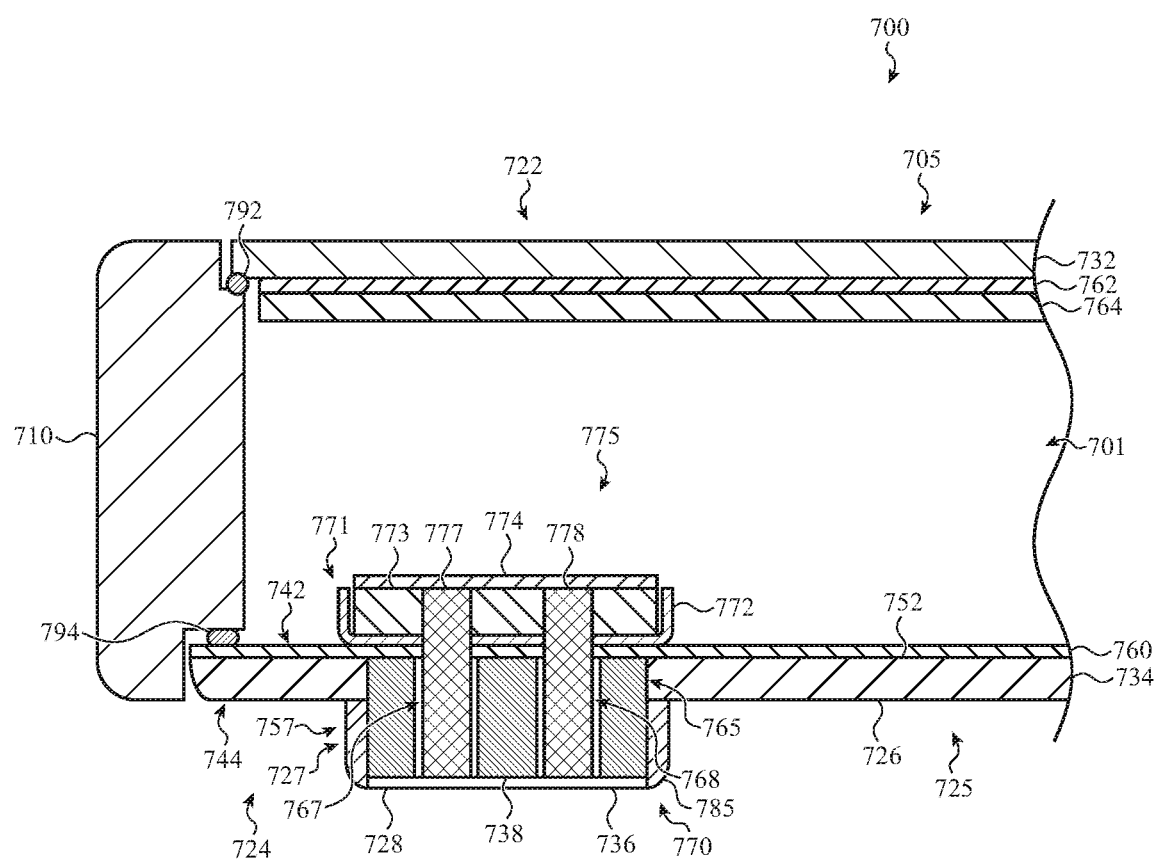
FIG. 7 shows an example cross-sectional view of another rear-facing sensing array of an electronic device.
Figure 8:
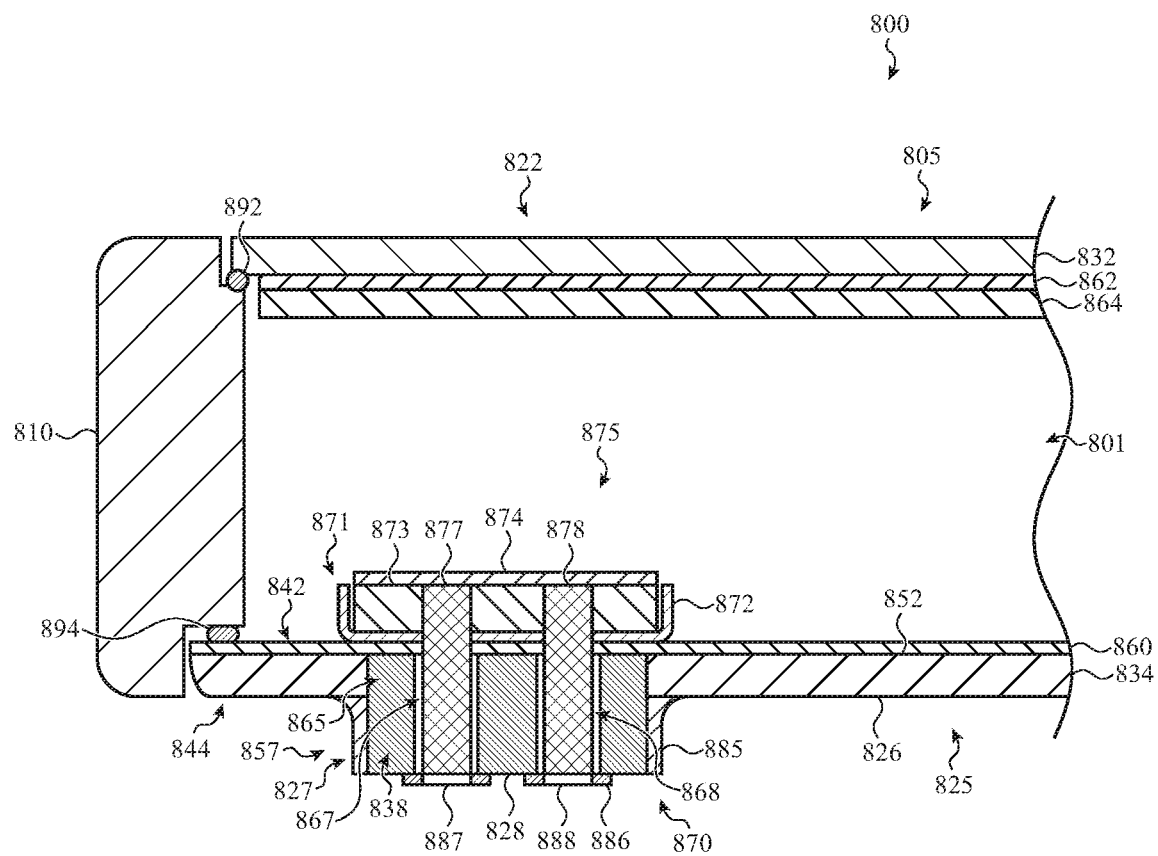
FIG. 8 shows an example cross-sectional view of another rear-facing sensing array of an electronic device.

In additional examples, the electronic device enclosure comprises a front cover member formed from a first glass ceramic material and a rear cover member formed from a second glass ceramic material. In some cases, the front cover member may be substantially transparent or may include one or more transparent portions positioned over a display or other device component configured to operate over a visible wavelength range. In additional cases, the front cover member may define one or more openings and one or more substantially transparent window members may be placed over or in the one or more openings. In some cases, the rear cover member may be substantially transparent or may include one or more transparent portions positioned over a device component configured to operate over a visible wavelength range. In additional cases, the rear cover member may define one or more openings and one or more substantially transparent window members may be positioned over or in the one or more openings (as shown in FIGS. 6-8). The first glass ceramic material may be substantially the same as the second glass ceramic material or may differ in composition or in the amount and/or size of crystals in the material.

These and other embodiments are discussed below with reference to FIGS. 1A through 12. However, those skilled in the art will readily appreciate that the detailed description given herein with respect to these figures is for explanatory purposes only and should not be construed as limiting.

Figure 1B:
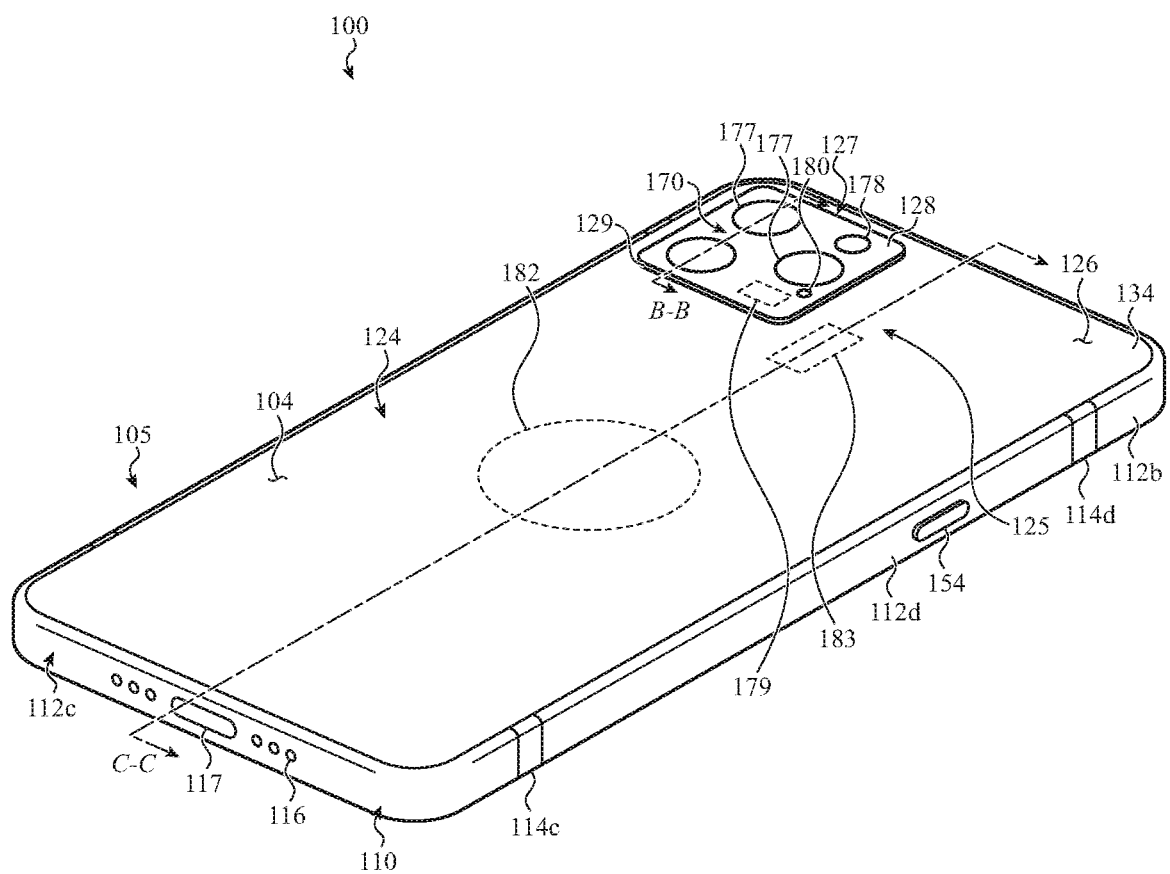
Figure 10:
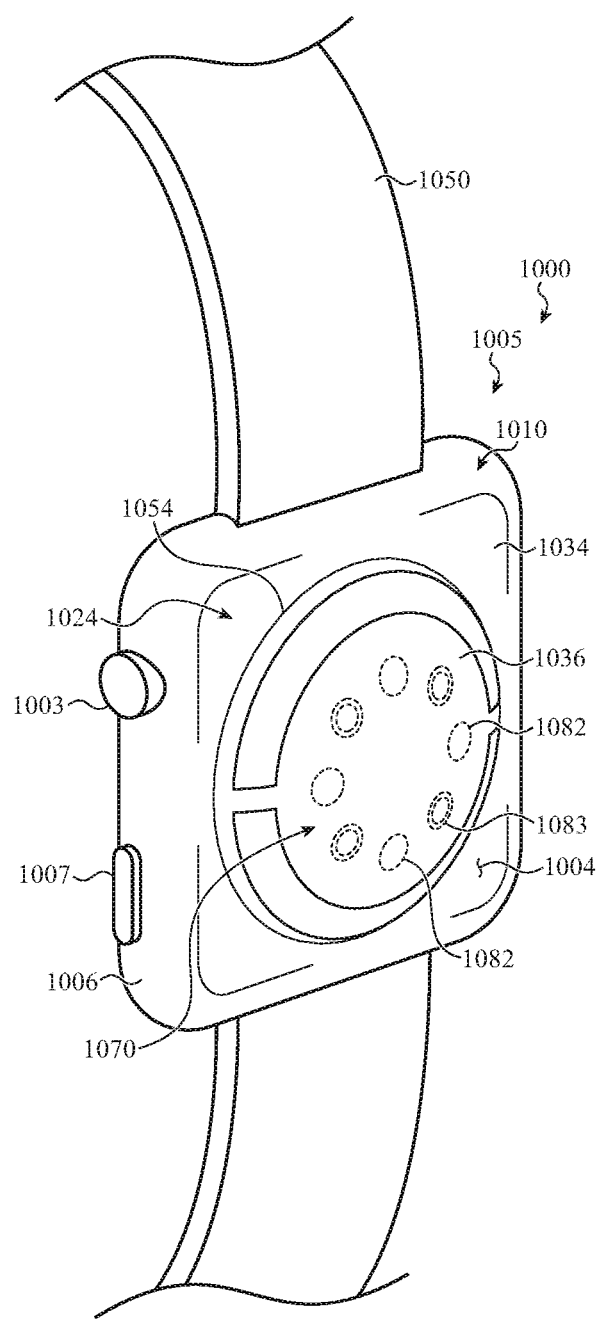
FIG. 10 shows another example electronic device including a sensing array.
Figure 11A:
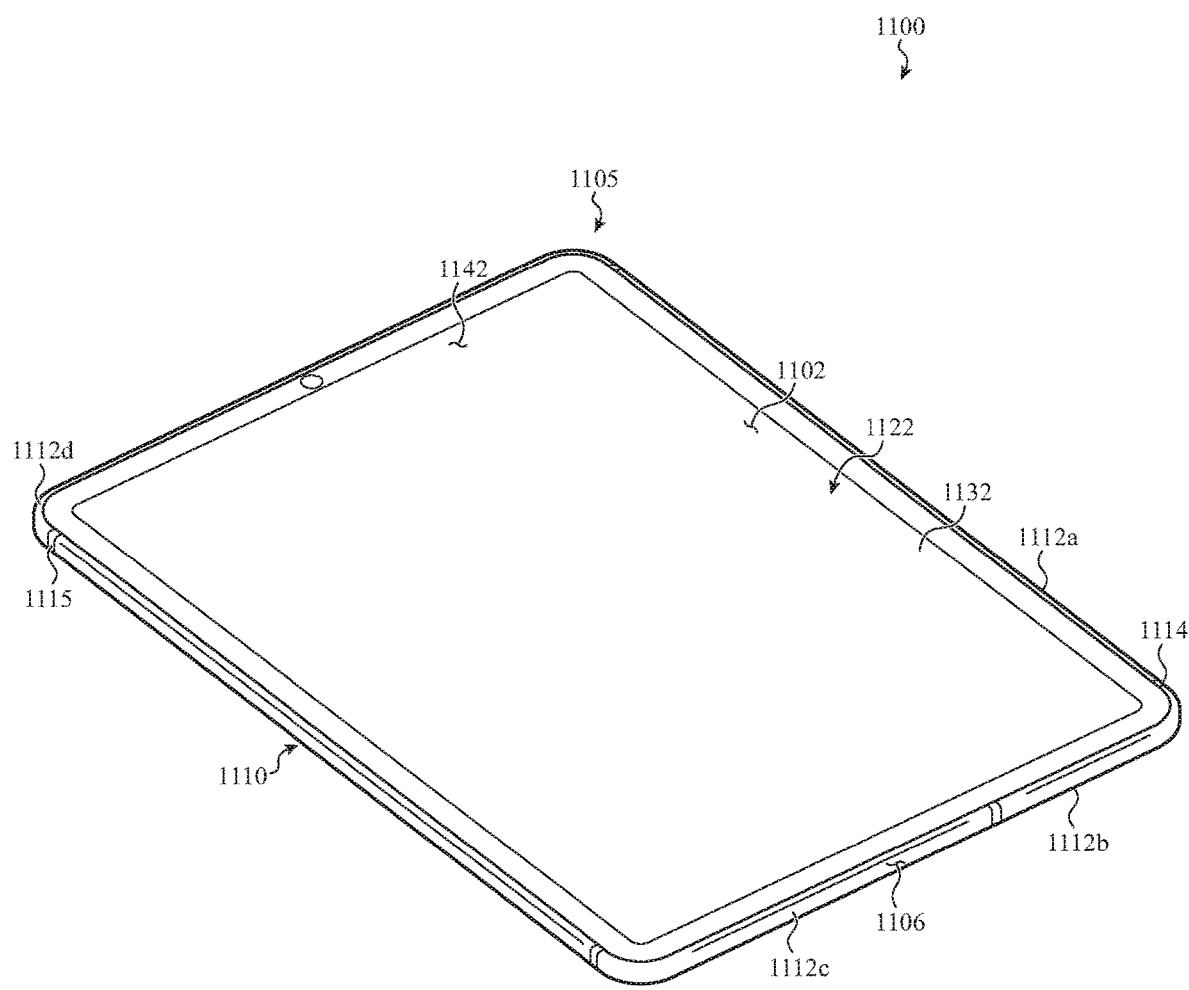
FIGS. 11A and 11B show views of an additional example electronic device including a sensing array.
Figure 11B:
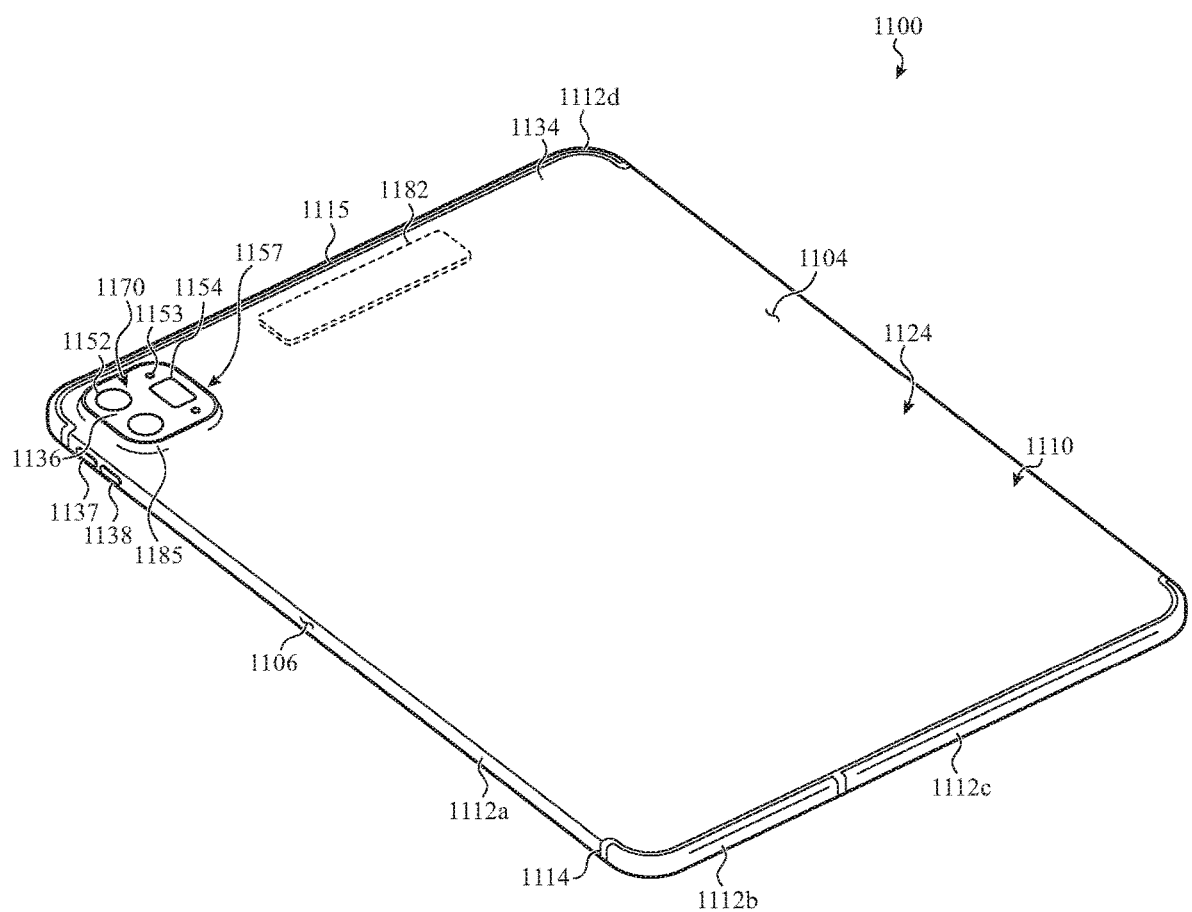

FIGS. 1A and 1B show an example of an electronic device or simply "device" 100. For purposes of this disclosure, the device 100 may be a portable electronic device including, for example, a mobile phone, a tablet computer, a portable computer, a wearable electronic device, a portable music player, a health monitor device, a portable terminal, a wireless charging device, device accessory, or other portable or mobile device. In the example of FIGS. 1A and 1B, the dimensions and form factor, including the ratio of the length of its long sides to the length of its short sides, correspond to those of a mobile phone. However, this example is not limiting, and examples of other device form factors are shown in FIGS. 10, 11A, and 11B.

As shown in FIGS. 1A and 1B, the electronic device 100 includes an enclosure 105. The enclosure 105 includes a front cover assembly 122, a rear cover assembly 124, and an enclosure component 110. Internal components of the device may be at least partially enclosed by the front and rear cover assemblies 122, 124 and the enclosure component 110 and, in some cases, may be positioned within an internal cavity defined by the enclosure (e.g., 601 of FIG. 6). The example of FIGS. 1A and 1B is not limiting and in other examples internal components of the device may be enclosed by an enclosure component in combination with a single cover or any other suitable configuration.

The enclosure 105 includes one or more components including a glass ceramic material. In some cases, these components are formed from the glass ceramic material and may be referred to as glass ceramic components. In some cases, the component including the glass ceramic material (e.g., the glass ceramic component) is in the form of a cover member included in the front cover assembly 122 and/or the rear cover assembly 124. In additional cases, the component including the glass ceramic material (e.g., the glass ceramic component) may be included in the enclosure component 110. The component including the glass ceramic material may be positioned over one or more internal components of the electronic device 100 such as a display 142, a camera assembly 144 (which may be part of a camera array), a sensor assembly 146 (which may be part of a sensor array), a radio-frequency (RF) antenna assembly (which may be a directional antenna assembly), a component for an inductive coupling wireless charging system, or the like.

The glass ceramic material may be configured to have sufficient hardness, strength, and toughness to provide scratch and impact resistance to the component and to the enclosure 105. As referred to herein, a glass ceramic material comprises one or more crystalline phases (e.g., crystals) formed by crystallization of a (precursor) glass material. These crystalline phases can contribute to the favorable mechanical properties of the glass ceramic material. The glass ceramic material may further comprise an amorphous (glass) phase and the crystals may be dispersed in the glass phase. In some examples, the amount of the crystalline phase(s) is greater than 10%, from 20% to 90%, from 30% to 90%, from 40% to 90%, from 50% to 90%, from 60% to 90%, from 70% to 90%, from 20% to 40%, from 20% to 60%, from 20% to 80%, from 30% to 60%, or from 30% to 80% of the glass ceramic material by weight. In some cases, these values may correspond to an average amount or a local amount of crystalline phase(s) in the glass ceramic component. The residual glass phase may form the balance of the material. The description of glass ceramic materials provided with respect to FIGS. 1A and 1B, including, but not limited to, the description of glass ceramic compositions, crystalline phase amounts, types, and sizes, and mechanical, optical, electrical, and magnetic properties, is not limited to the example of FIGS. 1A and 1B but is generally applicable herein.

A component including a glass ceramic material (e.g., a glass ceramic component) may be positioned over an internal component of the electronic device 100 and may also be configured to allow transmission of electromagnetic signals to and/or from the internal component. For example, a cover member including a glass ceramic material (e.g., a glass ceramic cover member) may have a haze value, a transmission value over a specified wavelength or frequency range, a color, or other optical properties suitable for use over a camera and/or a display. As another example, the glass ceramic material of the component may be configured to be RF-transmissive and may have a dielectric constant suitable for use over a radio-frequency antenna or wireless charging system. As a further example, the glass ceramic material of the component may have a magnetic permeability sufficiently low that it does not interfere with transmission of magnetic fields generated by the inductive coupling wireless charging system.

The component including a glass ceramic material (e.g., the glass ceramic component) may be substantially transparent, translucent, opaque, or include transparent, translucent, or opaque portions. For example, a transparent glass ceramic component may be formed from a glass ceramic material having crystals whose size is smaller than wavelengths of visible light (e.g., smaller than about 100 nm). In addition, the difference in refractive index between crystals and the glass phase may be relatively small. As referred to herein, an enclosure component formed from a particular material, such as a glass ceramic component, may also include a small amount of another material, such as a relatively thin coating of a different material along one or more surfaces.

In some cases, glass ceramic components or portions may be formed from glass ceramic materials having crystals which produce scattering of visible light. Such glass ceramic components or portions may be configured to affect transmission of light to and/or from an optical component of the electronic device and/or may produce a translucent and/or opaque effect. The scattering may be due to a difference between the index of refraction of the crystals and another phase present in the material and/or the size of the crystals. For example, crystals having a size (e.g., diameter) about the same size as a wavelength of light may produce scattering of that light. In some examples, even smaller crystals can produce scattering, such as crystals having a size equal to the wavelength multiplied by 0.06, 0.1, or 0.3. Larger crystals may produce more forward scattering of light so in some cases it may be desirable to limit the size of the crystals, such as to a size equal to the wavelength multiplied by 0.3, 0.7, or 1.0.

In some embodiments, at least some of the crystals may have a size which scatters light over all or part of the visible spectrum, but scatters light of longer wavelengths to a lesser extent. For example, near-infrared wavelengths of light, such from about 800 nm to about 2.5 microns, from 900 nm to about 1.6 microns, or from about 800 nm to about 1000 nm, may be scattered to a lesser extent than visible light wavelengths.

In some cases, a glass ceramic portion or component may be configured to have smaller crystals near an exterior surface of the portion or component than crystals in an interior and/or near an interior surface of the portion or component. A difference in crystal size through the thickness of the portion or component may be configured to affect transmission of light to and/or from an optical component of the electronic device, to produce an optical effect, or both. For example, the smaller crystals may produce less scattering of visible light near the exterior surface than in an interior and/or near the interior surface of the portion or component, creating a depth effect. The difference in crystal sizes may be achieved through a gradient of crystal sizes through at least a portion of the thickness, through creating regions of different crystal sizes through the thickness, or both. The crystal size gradient may be uniform or may be stepped. For example, the translucent glass ceramic portion or component may have a first crystal size in an exterior surface region and a second crystal size, larger than the first crystal size, in an interior region. In some cases, the translucent glass ceramic portion or component may include a gradient region between this exterior surface region and this interior region, with the gradient region having a crystal size gradient. In some cases, the thickness of the exterior surface region, the interior region, and/or the gradient region is at least 2 microns, at least 5 microns, at least 10 microns, or at least 20 microns.

As an example, crystals at the exterior surface of the component (e.g., in an exterior surface region) may have a size greater than zero and less than about 200 nm or about 100 nm. In addition, crystals in the interior and/or at the interior surface of the component (e.g., in an interior surface region) may have a size greater than about 200 nm and less than about 1.5 microns, greater than about 200 nm and less than about 1 micron, greater than about 200 nm and less than about 800 nm, greater than about 400 nm and less than 1 micron, or greater than about 600 nm and less than about 1.5 microns. These crystal sizes may be average crystal sizes in a given region of the glass ceramic component. In some cases, the variation in crystal size through the thickness of the portion or component produces a haze value from 10% to 50%, from 10% to 75%, from 20% to 50%, from 20% to 75%, or from 50% to 80%. In embodiments, the difference in crystal sizes may be produced in a thicker portion of a glass ceramic component (e.g., the thicker portion 127), by localized heating of the thicker portion.

By the way of example, the glass ceramic material may be an alkaline silicate, an alkaline earth silicate, an aluminosilicate, a boroaluminosilicate, a perovskite-type glass ceramic, a silicophosphate, an iron silicate, a fluorosilicate, a phosphate, or a glass ceramic material from another glass ceramic composition system. In some embodiments, the glass ceramic portion comprises an aluminosilicate glass ceramic or a boroaluminosilicate glass ceramic. In addition to the principal elements of the glass ceramic material (e.g., aluminum, silicon, and oxygen for an aluminosilicate), the glass ceramic material may also include other elements. For example, the glass ceramic material (and the precursor glass) may include elements from nucleating agents for the glass ceramic material, such as a metal oxide (Ti, Zr) or other suitable oxide material. Aluminosilicate and boroaluminosilicate glass ceramics may further include monovalent or divalent ions, some of which may compensate charges due to introduction of aluminum ions in the material. For example, an aluminosilicate glass ceramic may include alkali metal ions such as $Li^+$ or $Na^+$.

Glass ceramic materials can form a variety of crystalline phases and glass ceramic materials useful for the components described herein which include one or more crystalline phases. For example, aluminosilicate glasses can form several types of crystalline phases, including β quartz solid solution crystals, keatite solid solution crystals (β spodumene solid solution crystals), petalite crystals, lithium disilicate crystals, and various other silicates. Other silicates include, but are not limited to, silicates including aluminum and optionally other elements such as lithium, sodium, potassium, and the like. Examples of such silicates include lithium orthoclase, lithium orthosilicate, (Li, Al, Na) orthosilicates (e.g., α or β eucryptite), and lithium metasilicate. Some of these crystalline phases can be transformed into other crystalline phases. For example, β quartz solid solution crystals can transform into keatite/β spodumene crystals. Similarly, mixtures of crystal phases can be transformed into different mixtures.

In some cases, the glass ceramic component is chemically strengthened by ion exchange of the glass ceramic material. For example, an ion-exchangeable glass ceramic material may include monovalent or divalent ions such as alkali metal ions (e.g., $Li^+$, $Na^+$, or $K^+$) or alkaline earth ions (e.g., $Ca^{2+}$ or $Mg^{2+}$) that may be exchanged for other alkali metal or alkaline earth ions. If the glass ceramic material comprises sodium ions, the sodium ions may be exchanged for potassium ions. Similarly, if the glass ceramic material comprises lithium ions, the lithium ions may be exchanged for sodium ions and/or potassium ions. The ion exchange may occur in the glass phase, in a crystalline phase, or both. Exchange of smaller ions in the glass ceramic material for larger ions can form a compressive stress layer along a surface of the glass ceramic material. Formation of such a compressive stress layer can increase the hardness and impact resistance of the glass ceramic material. In some cases, the chemically strengthened glass ceramic component is configured to have a composition stable under typical use conditions of the electronic device and under processing conditions experienced subsequent to chemical strengthening (e.g., during a subsequent coating operation). When the ion exchange introduces sodium and/or potassium ions, the concentration of sodium and/or potassium ions at or near the surface of the glass ceramic material may be limited to ensure that the ion concentration is stable under typical use conditions. For example, in some cases the sodium concentration in a surface region (e.g., about 2 microns deep) may be limited to limit or prevent corrosion through reaction with moisture in the environment. The concentration of sodium (expressed as molar percent of sodium oxide) may be less than 10% or less than 5%.

In embodiments, the front cover assembly 122 is substantially transparent or includes one or more substantially transparent portions over the display 142 and/or an optical component configured to operate over a visible wavelength range (e.g., an optical component of the camera assembly 144). As referred to herein, a component or material is substantially transparent when light is transmitted through the material and the extent of scattering is low. For example, the transmission may be at least 80%, 85%, 90%, or 95% over a visible wavelength range (e.g., the visible spectrum) and the haze may be less than about 5% or 1%.

The front cover assembly 122 may also include one or more translucent and/or opaque portions in combination with the one or more substantially transparent portions. For example, the front cover assembly 122 may include a translucent or opaque portion around a periphery of the front cover assembly (e.g., extending inward from a side surface of the front cover assembly). As another example, the front cover assembly 122 may include a translucent or opaque portion around a periphery of an opening (e.g., the opening 135) in the front cover assembly 122. Further the front cover assembly 122 may include a translucent or opaque portion over a device component which is configured to operate over a range other than a visible wavelength or frequency range (e.g., an infrared (IR) wavelength range or a radio-frequency (RF) range). The translucent or opaque portions of the front cover assembly 122 may correspond to translucent or opaque portions of the cover member 132 and/or may correspond to portions where a translucent or opaque coating has been applied to the cover member 132.

In the example of FIG. 1A, the front cover assembly 122 includes a cover member 132 (also referred to herein as a front cover member). In some cases, the cover member 132 may be formed from a glass ceramic material. In additional cases, the cover member 132 may include one or more glass portions and one or more glass ceramic portions or may be formed from a glass ceramic layer in combination with one or more of a glass layer, a ceramic layer, or a polymer layer. In some cases, the ceramic layer may be substantially transparent, such as a sapphire layer. Typically, the cover member 132 is substantially transparent or includes one or more substantially transparent portions over a display and/or an optical component configured to operate over a visible wavelength range. The cover member 132 may also include one or more translucent and/or opaque portions in combination with the one or more substantially transparent portions. As previously described for the front cover assembly 122, the cover member 132 may include a translucent or opaque portion around a periphery of the cover member or around a periphery of an opening in the cover member. Further, the cover member 132 may include a translucent or opaque portion over a device component which is configured to operate over a range other than a visible wavelength or frequency range or over a device component of an inductive coupling wireless charging system.

The front cover assembly 122 may also include an exterior coating such as an oleophobic coating and/or an anti-reflective coating. Alternately or additionally, the front cover assembly 122 may include an interior coating such as a masking layer which provides an opaque portion of the front cover assembly 122. In addition, the front cover assembly may include a mounting frame which is coupled to an interior surface of the cover member 132 and to the enclosure component 110.

The front cover assembly 122 may at least partially define a front surface 102 of the electronic device. In the example of FIG. 1A, the front cover assembly may define a substantial entirety of the front surface 102 of the electronic device. In some embodiments, the cover member 132 has a thickness less than 3 mm, less than or equal to 2 mm, less than or equal to 1 mm, from about 250 microns to about 1 mm, or from about 500 microns to about 1 mm. The cover member 132 may extend laterally across the cover assembly 122, such as substantially across the width and the length of the cover assembly.

Figure 4:
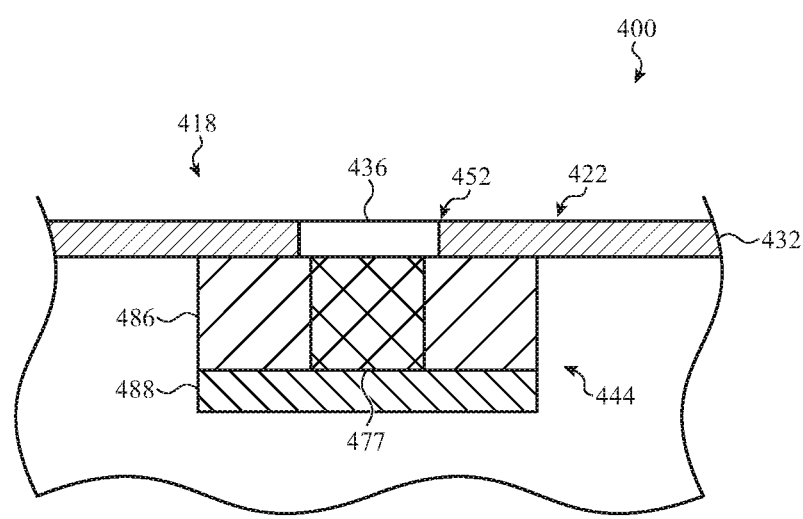
FIG. 4 shows another partial cross-sectional view of a sensing array.

In some cases, each of the front cover assembly 122 and the cover member 132 is positioned over the display 142, the camera assembly 144, and the sensor assembly 146. In other cases, the front cover assembly 122 may be positioned over the display 142, the camera assembly 144, and the sensor assembly 146, while the cover member 132 defines an opening over one or more of the camera assembly 144, and the sensor assembly 146 (as shown in FIG. 4). An opening 135 is provided in the front cover 122 and the cover member 132 and in some cases may provide a speaker port. The front cover assembly 122 and the cover member 132 may also be positioned over a component 181, which may be part of a wireless communication system.

Figure 2:
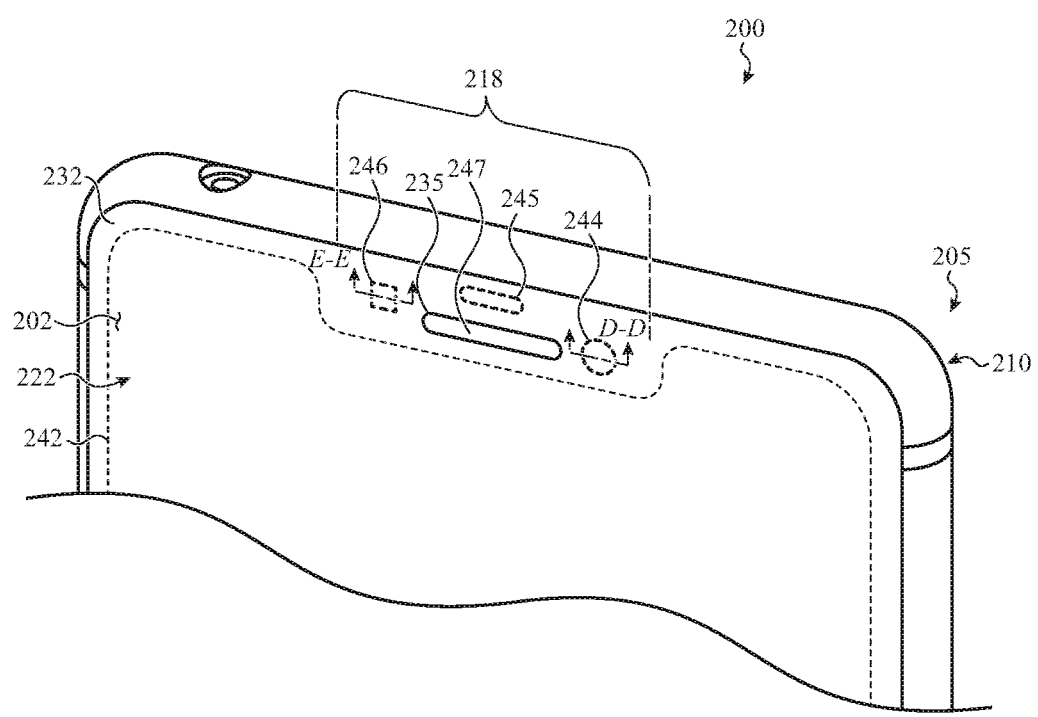
FIG. 2 shows an enlarged view of a sensing array of an electronic device.

The cover member 132 may be configured to provide optical properties suitable for use over the display 142, the camera assembly 144, and the sensor assembly 146. For example, these optical properties may include one or more of a haze value, a color value, or a transmission value. For example, the cover member 132 may be configured to have a haze value sufficiently low that the optical input to an optical module of the camera assembly 144 and/or the optical output provided by the display 142 is not significantly degraded. Similarly, the cover member 132 may be configured to have a sufficiently neutral color that the optical input to an optical module of the camera assembly 144 and/or the optical output provided by the display 142 is not significantly degraded. Further, the cover member 132 may be configured to have a sufficiently high transmission value over the wavelength range of operation of the camera assembly, display, and/or sensor assembly. In some cases, different portions of the cover member 132 may have different optical property ranges, as discussed in more detail below. The description of optical property ranges provided with respect to FIG. 2 is generally applicable herein and, for brevity, is not repeated here.

The cover member 132 may also be configured to provide electrical properties suitable for use over a component of a wireless communication device, such as the component 181. For example, the cover member 132 may be a dielectric cover member and may be formed from a material having a dielectric constant and a dissipation factor sufficiently low to allow transmission of RF or IR (e.g., near-IR) signals through the cover member.

The electronic device 100 includes a display 142. The front cover assembly 122 is positioned over the display 142. As previously discussed, the front cover assembly 122 may be substantially transparent or include one or more substantially transparent portions over the display and/or an optical component configured to operate over a visible wavelength range. The enclosure 105 may at least partially surround the display 142 and may enclose the display 142. The display 142 may produce graphical output which is transmitted through a substantially transparent portion of the front cover assembly. In some cases, the display 142 is a touch sensitive display. The display 142 may be a liquid-crystal display (LCD), a light-emitting diode (LED) display, an LED-backlit LCD display, an organic light-emitting diode (OLED) display, an active layer organic light-emitting diode (AMOLED) display, and the like. In some embodiments, the display 142 may be attached to (or may abut) the front cover assembly 122.

The electronic device 100 further includes multiple sensing arrays. As referred to herein, a sensing array may include one or more camera assemblies (e.g., a camera array), one or more sensor assemblies (e.g., a sensor array), an illumination assembly, or combinations of these. The front sensing array 118 includes a front-facing camera assembly 144 and a front-facing sensor assembly 146. The front sensing array may also include another sensor assembly 145, which in some cases may be an ambient light sensor. The rear sensing array 170 includes an array of rear-facing camera assemblies and at least one sensor assembly as described in more detail below. An illumination assembly typically includes a light source such as a flood light source or other emitter which enables various sensing modes like face recognition and digital photography. For example, one or more emitters may emit an array of beams that are reflected off various parts of the face. The reflected beams can be used to create a point or depth map of the face and used to authenticate a user.

The sensing array may include one or more optical modules. An optical module may include a photodetector and/or image sensor, associated electronics, one or more optical lenses, optical covers, barrels, or shrouds and associated optical elements. For example, the optical module may be a camera module, an illumination module, or a sensor module. The sensing array may define any number of optical modules such as one, two, three, four, five, or six optical modules.

As shown in FIGS. 1A and 1B, the electronic device 100 includes multiple camera assemblies. For example, the electronic device 100 may include a front-facing camera assembly 144 and a rear-facing camera array. Each camera assembly may include a camera module (e.g., the optical module 177 shown in FIG. 1B). An array of camera assemblies (also referred to herein as a camera array) typically includes multiple camera modules and one or more illumination modules. When the camera array includes multiple camera modules, each of the camera modules may have a different field of view or other optical property. For example, a camera module may be configured to produce an image from visible light or infrared light. The multiple camera modules may be also referred to as a set of camera modules and in some cases may form an array of camera modules. In some cases, a camera module includes an optical sensor array and/or an optical component such as a lens, filter, or window. In additional cases, a camera module includes an optical sensor array, an optical component, and a camera module housing surrounding the optical sensor array and the optical components. The camera module may also include a focusing assembly. For example, a focusing assembly may include an actuator for moving a lens of the camera module. In some cases, the optical sensor array may be a complementary metal-oxide semiconductor (CMOS) array or the like.

The electronic device 100 further includes one or more sensor assemblies. As shown in FIG. 1A, the electronic device 100 includes one or more front-facing sensor assemblies 146. The device 100 also includes one or more rear-facing sensor assemblies as described in more detail with respect to FIG. 1B. A sensor assembly may also be referred to herein simply as a sensor. Examples of sensor (assemblies) include, but are not limited to, a proximity sensor, a light sensor (e.g., an ambient light sensor), a biometric sensor (e.g., a face or fingerprint recognition sensor or a health monitoring sensor), a depth sensor, or an imaging sensor. Other examples of sensors include a microphone or a similar type of audio sensing device, a radio-frequency identification chip, a touch sensor, a force sensor, an accelerometer, a gyroscope, a magnetometer, such as a Hall-effect sensor or other magnetic sensor, or similar types of position/orientation sensing devices. When the sensor is an optical sensor, the sensor may operate over a particular wavelength range such as a visible, an infrared, or an ultraviolet wavelength range. In some cases, the optical sensor is a reflectance sensor. The electronic device may further include a processing unit (also, processor) that computes a value based on a signal from the sensor.

Figure 3:
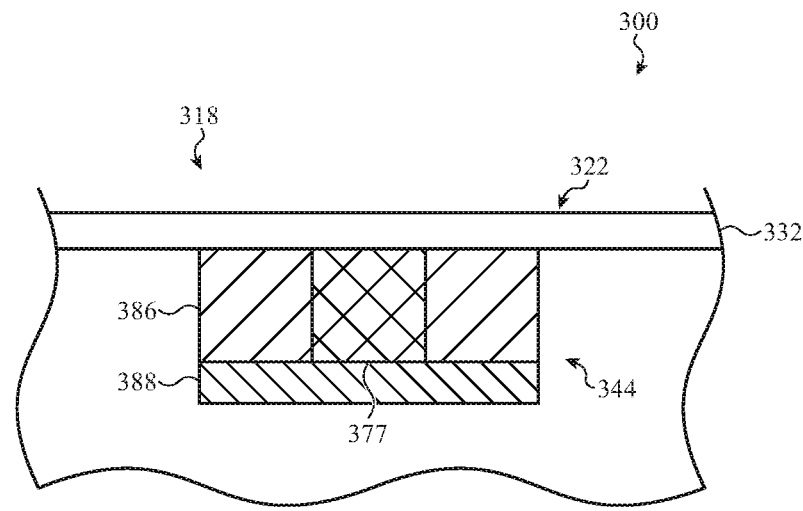
FIG. 3 shows a partial cross-sectional view of a sensing array.

In some cases, one or more sensors may be grouped with one or more camera assemblies. As examples, the one or more sensors may be a depth measuring sensor (e.g., a time of flight sensor), an ambient light sensor, a facial recognition sensor, an infrared sensor, an ultraviolet light sensor, a health monitoring sensor, a biometric sensor (e.g., a fingerprint sensor), or the like. These sensors may be provided proximate to one or more optical modules of a camera array, as shown in FIG. 1B. The additional description of sensor assemblies, camera assemblies, and processors provided with respect to FIGS. 2 through 4 is generally applicable herein and, for brevity, is not repeated here.

In addition, the electronic device 100 may include one or more device components that may be part of a wireless communication system, such as the device components 181, 183, and 185. As examples, the wireless communication system may be a RF or an IR communication system. In some cases, the device components 181, 183, and 185 are antenna assemblies, also referred to herein simply as antennas. An RF communication system may operate at one or more of a "low band" frequency range (e.g., 600 MHz to 700 MHz), a "mid-band" frequency range (e.g., a frequency below 6 GHz (sub-6 GHz), 2.5 GHz to 3.5 GHz, or a "high-band" frequency range (e.g., 24 GHz to 39 GHz, 57 to 64 GHz, or 64 to 71 GHz). As previously discussed, a component of an RF communication system may include an RF antenna configured to radiate a radio-frequency (RF) signal. The RF antenna may be configured to operate at one or more desired RF frequency ranges or RF frequency bands.

In some cases, the electronic device 100 may include one or more groups of antennas that include elements that are configured to communicate via a 5G wireless protocol (including millimeter wave and/or 6 GHz communication signals). 5G communications may be achieved using various different communications protocols. For example, 5G communications may use a communications protocol that uses a frequency band below 6 GHz (also referred to as the sub-6 GHz spectrum). As another example, 5G communications may use a communications protocol that uses a frequency band above 24 GHz (also referred to as the millimeter-wave spectrum). Further the particular frequency band of any given 5G implementation may differ from others. For example, different wireless communications providers may use different frequency bands in the millimeter-wave spectrum (e.g., one provider may implement a 5G communications network using frequencies around 28 GHz, while another may use frequencies around 39 GHz). The antenna group(s) may be configured to allow communications via one or multiple of the frequency bands that implement 5G communications.

In some cases, the electronic device 100 includes one or more directional antennas (or high gain antennas). Accordingly, the antenna gains of the directional antennas may be highest along particular directions. A directional antenna may include an array of transceiver elements that are used to form the shapes and orientations of the radiation patterns (or lobes) of the antenna, which may be a millimeter wave antenna. The electronic device 100 may include multiple directional antennas which have different primary transmission directions, as explained further with respect to FIGS. 9A and 9B.

The enclosure component 110 may at least partially define a side surface 106 of the electronic device 100 and may also be referred to herein as a housing. An enclosure component used in combination with front and rear cover assemblies as shown in FIGS. 1A and 1B may also be referred to as a band. The enclosure component 110 may include one or more members. In the example of FIGS. 1A and 1B, the enclosure component includes multiple members formed from a metal material (e.g., one or more metal segments). In particular, the enclosure component 110 is formed from a series of metal segments (112a, 112b, 112c, and 112d) that are separated by dielectric segments (114a, 114b, 114c, and 114d) that provide some extent of electrical isolation between adjacent metal segments (e.g., by preventing electrical conduction through the dielectric segments). For example, a polymer segment (114b) may be provided between a pair of adjacent metal segments (112a, 112c). One or more of the metal segments may be coupled to internal circuitry of the electronic device 100 and may function as an antenna for sending and receiving wireless communication. In alternate embodiments, the enclosure component 110 may include one or more members formed from a glass material, one or more members formed from a ceramic material, one or more members formed from a glass ceramic material, combinations of these or combinations of these with one or more members formed from a metal material. The example of FIGS. 1A and 1B is not limited, and in other examples the enclosure component 110 may have a different number of members or may be of unitary construction (e.g., a unibody). As referred to herein, an enclosure component or member formed from a particular material, such as a metal material, may also include a relatively thin coating of a different material along one or more surfaces, such as an anodization layer, a physical vapor deposited coating, a paint coating, a primer coating (which may include a coupling agent), or the like.

The enclosure component 110 may define one or more openings or ports. In the example of FIGS. 1A and 1B, the metal segment 112c of the enclosure component 110 defines the openings 116 and 117. The opening 116 may allow (audio) input or output from a device component such as a microphone or speaker. The opening 117 may contain an electrical port or connection. In addition, the electronic device 100 may include one or more input devices. In the example of FIGS. 1A and 1B, the input devices 152 and 154 have the form of a button and may extend through additional openings in the enclosure component 110. In some cases, the electronic device 100 also includes a support plate and/or other internal structural components that are used to support internal electronic circuitry or electronic components.

In some cases, the enclosure component 110 may include one or more members 115 positioned within a metal member (e.g., 112a). In some cases, the member 115 may provide a window for the device component 185, may define a portion of a waveguide, and/or allow for beam-forming or beam-directing functionality. For example, the member 115 may define an antenna window for transmitting and receiving wireless signals. The member 115 may be configured to transmit wireless signals at one or more of the frequencies previously discussed with respect to the device components 181, 183, and 185. For example, the member 115 may be configured to transmit wireless signals at a frequency band between about 25 GHz and 39 GHz.

The member 115 may include a cover member 136. The cover member 136 may be formed from a dielectric material. In some cases, the cover member 136 may be formed from a glass ceramic material, may include one or more glass ceramic portions or may be formed from a glass ceramic layer in combination with one or more of a glass layer, a ceramic layer, or a polymer layer. In additional cases, the cover member 136 may be formed from a glass material, a ceramic material, a polymeric material, or combinations thereof. The cover member 136 may be substantially transparent, translucent, opaque or include transparent, translucent and/or opaque portions. Further the member 115 may also include one or more coatings along the interior and/or exterior of the cover member 136. These coatings may be similar to those described for the cover members 132 and 134.

The rear cover assembly 124 may at least partially define a rear surface 104 of the electronic device. In the example of FIG. 1B, the rear cover assembly 124 may define a substantial entirety of the rear surface 104 of the electronic device. The rear cover assembly 124 includes a cover member 134. In some cases, the rear cover assembly 124 also includes at least one (optically) transparent window member. In the example of FIG. 1B, the rear cover assembly 124 is positioned over the device component 182, which may be a wireless charging component, and the device component 183, which may be a wireless communication component.

The rear cover assembly 124 may be substantially transparent or may include one or more substantially transparent portions (e.g., over an optical component 177 configured to operate over a visible wavelength range). The rear cover assembly 124 may also include one or more translucent and/or opaque portions in combination with the one or more substantially transparent portions. For example, the rear cover assembly 124 may include a translucent portion over a device component which is configured to operate over a range other than a visible wavelength or frequency range (e.g., an infrared (IR) wavelength range or a radio-frequency (RF) range). Similarly, the rear cover assembly 124 may include a translucent or opaque portion over a device component 182 of an inductive coupling wireless charging system. In addition, the rear cover assembly 124 may include a translucent or opaque portion around a periphery of the cover member, around a periphery of an opening in the rear cover assembly, in the vicinity of the sensing array 170, and/or surrounding the sensing array 170. The translucent or opaque portions of the rear cover assembly 124 may correspond to translucent or opaque portions of the cover member 134 and/or may correspond to portions where a translucent or opaque coating has been applied to the cover member 134.

As previously discussed, the rear cover assembly 124 includes a cover member 134 (also referred to herein as a rear cover member). In some cases, the cover member 134 may be formed from a glass ceramic material. In additional cases, the cover member 134 may be formed from a glass material, may include one or more glass portions and one or more glass ceramic portions, or may be formed from a glass ceramic layer in combination with one or more of a glass layer, a ceramic layer, or a polymer layer. In some cases, the ceramic layer may be substantially transparent, such as a sapphire layer. The cover member 134 may be substantially transparent or may include one or more substantially transparent portions (e.g., over an optical component configured to operate over a visible wavelength range). The cover member 134 may also include a translucent or opaque portion in a similar fashion as previously described for the rear cover assembly 124. In some cases, the cover member 134 may extend laterally across the cover assembly 124, such as substantially across the width and the length of the cover assembly. In other cases, the cover member 134 may define an opening and the rear cover assembly 124 may include an additional cover member positioned over or within the opening, as described further below and with respect to FIG. 7.

The rear cover assembly 124 may also include one or more coatings. For example, the rear cover assembly 124 may include an exterior coating such as an oleophobic coating. Alternately or additionally, the rear cover assembly 124 may include an interior coating which provides a decorative effect, such as an ink layer or metal layer. In addition, the rear cover assembly 124 may include a mounting frame which is coupled to an interior surface of the cover member 134 and to the enclosure component 110.

In the example of FIG. 1B, the rear cover assembly 124 defines a thinner portion 125 and a thicker portion 127. As shown in FIG. 1B, the thicker portion 127 of the cover assembly 124 protrudes or is offset with respect to a thinner portion 125 of the cover assembly 124. The portion of the thicker portion 127 which protrudes with respect to the thinner portion 125 may also be referred to as a protruding region (as noted in the cross-sectional view of FIGS. 6 and 7). The thicker portion 127 may define a raised surface 128 (also referred to as a top surface) and a side surface 129 while the thinner portion 125 may define a surface 126.

In some cases, the cover assembly 124 is configured to produce optical contrast between the raised surface 128 and the surface 126. For example, the raised surface 128 may appear more transparent than the surface 126 (or vice versa). As an additional example, the raised surface 128 may have a different texture than the surface 126 and the texture difference may produce an optical effect. For example, a smooth (polished) texture on the raised surface 128 may reflect more light than a rougher texture on the surface 126 (or vice versa). In some cases, the raised surface 128 may have a root mean square height less than that of the surface 126, as explained in more detail with respect to FIG. 6 and this description is generally applicable herein. In additional cases, similar textures may be provided on the surfaces 126 and 128.

In some cases, the cover member 134 may define a corresponding thicker portion and thinner portion, with the thicker portion being integrally formed with the thinner portion. In additional cases, the thinner portion 125 may be provided by the cover member 134 while the thicker portion 127 may be provided at least in part by an additional cover member which is coupled to the thinner portion. For example, the cover member 134 may define an opening and the rear cover assembly 124 may include an additional cover member positioned within the opening as described with respect to FIG. 8 or additional cover members positioned over and within the opening as described with respect to FIG. 7.

In some cases, the thicker portion 127 may have a thickness greater than about 1 mm and less than or equal to about 2.5 mm or greater than about 1 mm and less than or equal to about 2 mm and the thinner portion 125 may have a thickness from about 250 microns to about 1 mm, or from about 500 microns to about 1 mm. The amount of protrusion or offset between the raised surface 128 and the surface 126 may be from about 0.5 mm to about 1.5 mm. The size of the thicker portion 127 may depend at least in part on the size of the sensing array 170. In some embodiments, a lateral dimension (e.g., a width) of the thicker portion 127 may be from about 5 mm to about 30 mm or from about 10 mm to about 20 mm.

The thicker portion 127 may accommodate one or more components of a sensing array 170. For example, the sensing array 170 may include multiple camera assemblies. Each of the camera assemblies may include an optical component such as the optical component 177 or the optical component 178. The optical component 177 may be positioned at least partially within an opening in the thicker portion 127, as shown for optical component 677 in FIG. 6. The optical component 177 may be a camera module while the optical component 178 may be an illumination module.

In addition, the sensing array 170 may include one or more sensor assemblies, such as the sensor assembly 179. In some cases, the sensor assembly 179 may measure a distance to a target, such as a Lidar sensor assembly which is configured to illuminate an object with light and then detect the reflected light to determine or estimate the distance between the electronic device and the object (e.g., a time of flight (TOF) sensor). In some examples the sensor assembly 179 may be positioned below the cover member 134 (and the cover member 134 may act as a window for the sensor assembly 179). In these examples, the optical properties of the cover member 134 may be suitable for use over one or more optical components of the sensor assembly. For example, the one or more optical components may operate over one or more specified wavelength ranges and the cover member 134 may be configured to have a suitable transmission/transmittance over these wavelength ranges. In other examples, the cover member 134 may define an opening over the sensor assembly and an additional cover member may be placed in or over the opening (and act as a window for the sensor assembly).

In some cases, a sensor assembly may include one or more optical modules. For example, the sensor assembly may include an emitter module, a receiver module, or both. The thicker portion 127 may also include a sensor assembly 180 which is other than an optical component. For example, the sensor assembly 180 may be a microphone which may be positioned at least partially within or below an opening in the thicker portion 127. In implementations in which the thicker portion 127 is used to protect one or more sensor modules or components, the thicker portion 127 and/or the protruding region of the thicker portion 127 may be referred to as a sensor feature, a camera feature, a sensing array, a camera panel, and/or a camera bump.

The cover member 134 may be configured to provide electrical properties suitable for use over a component of a wireless communication, such as the component 183. For example, the cover member 134 may be a dielectric cover member and may be formed from a material having a dielectric constant and a dissipation factor sufficiently low to allow transmission of RF or IR (e.g., near-IR) signals through the cover member.

Alternately or additionally, the cover member 134 may be formed from a material having magnetic properties suitable for use over a component of an inductive coupling wireless charging system. In particular, the cover member 134 may be formed from a material having a magnetic permeability sufficiently low that it does not interfere with transmission of electromagnetic fields generated by the inductive coupling wireless charging system. In some cases, the cover member 134 may be substantially non-magnetic. For example, the component of an inductive coupling wireless charging system may include a wireless receiver component such as a wireless receiver coil or other feature of the wireless charging system. The description of magnetic property ranges provided with respect to FIG. 2 is generally applicable herein and, for brevity, is not repeated here. In alternate embodiments, the wireless charging system may be a radio frequency wireless charging system rather than an inductive coupling wireless charging system. The cover member 134 may thus be configured to have dielectric properties suitable for use with a radio frequency wireless charging system, which in some cases may be similar to those suitable for use with a radio frequency wireless communication system. In some cases, a radio frequency wireless charging system may operate at a frequency range from about 80 kHz to about 300 kHz or from about 110 kHz to about 205 kHz. The description of electrical property ranges provided with respect to FIG. 2 is generally applicable herein and, for brevity, is not repeated here.

FIG. 2 shows an enlarged view of a sensing array of an electronic device. The electronic device 200 may be an example of the electronic device 100 of FIGS. 1A and 1B. The electronic device 200 includes a sensing array 218. The sensing array 218 includes a proximity sensor 246, a microphone 247, an ambient light sensor 245, and a camera assembly 244. In the example of FIG. 2, the proximity sensor 246, the ambient light sensor 245, and the camera assembly 244 are positioned below the cover assembly 222, as schematically indicated by the dashed lines. The microphone 247 may be positioned below the opening 235. The sensing array 218 may be located on any suitable surface 202 of the electronic device, such as a front surface or a rear surface. In the example of FIG. 2, the electronic device includes a display 242, but in other examples a display need not be included proximate the sensing array 218.

The cover assembly 222 includes a cover member 232. In some cases, the cover member 232 may be formed from a glass ceramic material. In additional cases, the cover member 232 may include one or more glass portions and one or more glass ceramic portions or may be formed from a glass ceramic layer in combination with one or more of a glass layer, a ceramic layer, or a polymer layer. The cover assembly 222 is part of the enclosure 205, which also includes an enclosure component 210. The cover assembly 222, the cover member 232, the enclosure 205, and the enclosure component 210 may be similar to the cover assembly 122, the cover member 132, the enclosure 105, and the enclosure component 110 described with respect to FIG. 1A, and for brevity, those details are not repeated here.

The camera assembly 244 typically includes a camera module (e.g., the camera modules 377 and 477 in the cross-section view of FIGS. 3 and 4). The camera module of the camera assembly 244 may produce images from visible light. However, the electronic device 200 may also include an optical module that is configured to operate over an IR range, such as a near-IR camera module. In such a case, the optical properties of the cover member 232 may be suitable for optical components configured to operate over both a visible wavelength range and a near-IR range. The camera assembly 244 may be positioned along a side of the display 242.

In some cases, a camera module includes an optical sensing array and/or an optical component such as a lens, filter, or window. In additional cases, a camera module includes an optical sensing array, an optical component, and a camera module housing surrounding the optical sensing array and the optical components. The camera module may also include a lens assembly, which may include moving elements and/or moving lenses. For example, a focusing assembly may include an actuator for moving a lens of the camera module. In some cases, the optical sensing array may be a complementary metal-oxide semiconductor (CMOS) array or the like.

In some cases, a cover member 232 is suitable for use over a camera module of a camera assembly 244 configured to produce images from visible light. Such a cover member 232 may have a haze value less than 1%, less than 0.8%, from 0.05% to less than 0.8%, from 0.1% to less than 0.8%, from 0.2% to less than 0.8%, from 0.3% to less than 0.8%, from 0.4% to less than 0.8%, from 0.5% to less than 0.8%, from 0.05% to 0.6%, from 0.1% to 0.6%, from 0.2% to 0.6%, from 0.3% to 0.6%, from 0.05% to 0.5%, from 0.1% to 0.5%, from 0.2% to 0.5%, from 0.05% to 0.4%, from 0.1% to 0.4%, or from 0.2% to 0.4%. The haze value may be a transmissive haze value and typically depends on the thickness of the cover member. The thickness of the cover member 232 may be any of the thicknesses previously described with respect to the cover members 132 or 134. The transmissive haze of the cover member 232 may be measured using commercially available equipment and according to ASTM or ISO standard test methods. The transmissive haze may relate to the amount of light subject to wide angle scattering (e.g., greater than 2.5 degrees). As non-limiting examples, the transmissive haze may be measured using a haze-gard i device available from BYK or a GC 5000L variable photometer available from Nippon Denshoku. The transmissive haze scattering may be measured for the cover member as removed from the electronic device. In other example, the transmissive haze scattering may be measured for the cover assembly 222.

In addition, a cover member 232 suitable for use over a camera module of a camera assembly 244 (which produces images from visible light) may have a transmission or transmittance over a visible wavelength range (e.g., from 400 nm to 700 nm) greater than 80%, greater than 82%, greater than 84%, greater than 85%, greater than 86%, greater than 87%, greater than 88%, greater than 89%, greater than 90%, greater than 91%, greater than 92%, greater than 93%, greater than 94%, or greater than 95%. These transmission values may be average values over the visible wavelength range. The transmission may depend upon the thickness of the cover member and the thickness of the cover member 232 may be any of the thicknesses previously described with respect to the cover members 132 or 134. The transmission (or transmittance) over of the cover member 232 may be measured using commercially available equipment and according to ASTM or ISO standard test methods. As a non-limiting example, the efficiency of light transmission (e.g., total transmission) may be measured using a haze-gard i device available from BYK. The transmission or transmittance may be measured for the cover member as removed from the electronic device. Alternately, the transmission may be measured for the cover assembly 222. The transmission value may depend upon the extent of absorption of the electromagnetic signal by the material of the cover member (or other component). For some measurement techniques, the transmission value may also depend upon scattering of the electromagnetic signal by the material of the cover member (or other component).

Further, a cover member 232 suitable for use over a camera module of a camera assembly 244 (which produces images from visible light) may have a neutral color. In some cases, coordinates in CIEL*a*b* (CIELAB) color space may be used to characterize a color of the cover member 232. In CIEL*a*b*(CIELAB) color space, L* represents brightness, a* the position between red/magenta and green, and b* the position between yellow and blue. A broadband or semi-broadband illuminant may be used to determine the color of a portion of the cover member or cover assembly. For example, a CIE illuminant or other reference illuminant may be used. The color of the cover member 232 may be determined from transmitted light and/or reflected light when the cover member 232 is transparent or translucent. In some embodiments, the CIELAB coordinates for a given illuminant can be calculated from measurements of transmission through the cover member 232. For example, the color may be characterized by an a* value having a magnitude less than 1, less than or equal to 0.5, less than or equal to 0.25, less than or equal to 0.1, or less than or equal to 0.05. In addition, the color may be characterized by a b* value having a magnitude less than 2, less than or equal to 1.5, less than or equal to 1, less than or equal to 0.75 or less than or equal to 0.5. The L* value may be greater than 85, greater than or equal to 90, or greater than or equal to 95. In some embodiments, haze, transmission, and/or color values suitable for use over a camera module of a camera assembly 244 configured to produce images from visible light are also suitable for use over the display 242.

Figure 5:
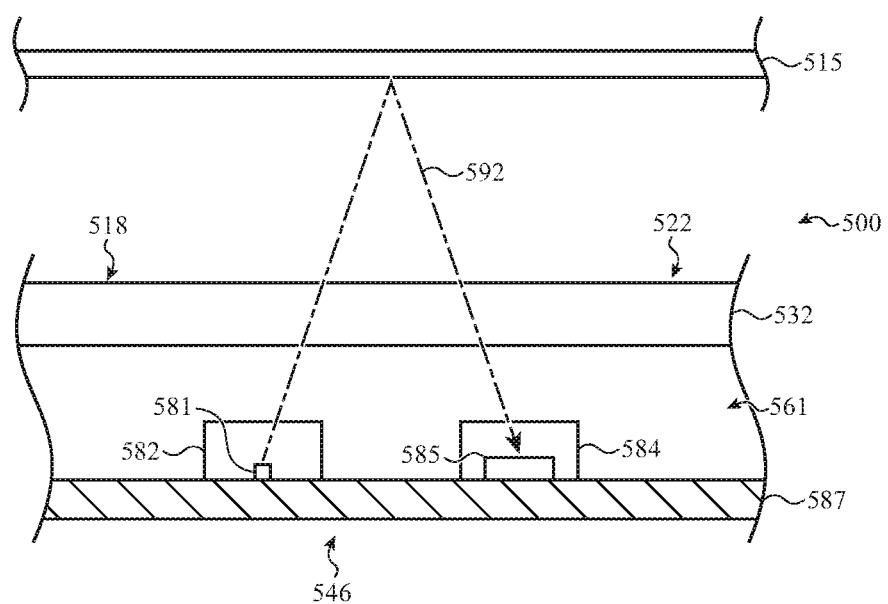
FIG. 5 shows an additional partial cross-sectional view of a sensing array.

The proximity sensor 246 may comprise a light-emitting module and a light-receiving module, as shown in the cross-section view of FIG. 5. The light-emitting module of a proximity sensor may produce infrared light. In some embodiments, the light-emitting module produces near-infrared (near-IR) light such as light having a wavelength from about 800 nm to about 2.5 microns, from 900 nm to about 1.6 microns, or from about 800 nm to about 1000 nm. In some cases, the proximity sensor may be a time of flight sensor.

In additional cases, the cover member 232 is also suitable for use over an optical component configured to produce images from infrared light (e.g., near-IR light). As examples, the camera assembly 244 may include an IR camera module or the sensing array 218 may further include a sensor assembly comprising an IR light-emitting module which projects a spatial pattern (e.g., a pattern of dots), or a flood IR light-emitting (illuminating) module in addition to an IR camera. Such a sensor assembly may be used for biometric identification. In these cases, the cover member 232 may have a transmission over an infrared wavelength range (e.g., from 770 nm to 1000 nm) greater than 85%, greater than 86%, greater than 87%, greater than 88%, greater than 89%, greater than 90%, greater than 91%, greater than 92%, greater than 93%, greater than 94%, or greater than 95%. These transmission values may be average values over the infrared wavelength range. The transmission may depend upon the thickness of the cover member and the thickness of the cover member 232 may be any of the thicknesses previously described with respect to the cover members 132 or 134.

The ambient light sensor 245 may comprise a light sensing module which can provide measurements of ambient light intensity. In some cases, the ambient light sensor can include color sensing. Although the example of FIG. 2 shows an ambient light sensor 245 as separated from the proximity sensor 246 in other examples the ambient light sensor 245 may be packaged with the proximity sensor 246.

In some cases, additional sensors may be located in the vicinity of the sensing array 218. For example, the sensing array 218 may further include a sensor assembly comprising an IR light-emitting module which projects a spatial pattern (e.g., a pattern of dots), a flood IR light-emitting (illuminating) module, and an IR camera. Such a sensor assembly may be used for biometric identification. As an additional example, the sensing array 218 may include a sensor assembly that measures distance to a target, such as a Lidar sensor assembly which is configured to illuminate an object with light and then determine the distance to the object from the reflected light (e.g., a time of flight (TOF) sensor). Such a sensor assembly may include a light emitting module (e.g., a laser) and a receiver module and may be used in combination with a camera module. A Lidar sensor can provide a digital three-dimensional representation of the object, which can be used for multiple applications, including augmented reality (AR) and virtual reality (VR). In addition, other device components, such as a speaker, may be located in and/or below the sensing array 218.

FIG. 3 schematically shows a partial cross-sectional view of a sensing array of an electrical device 300. The sensing array 318 includes a camera assembly 344, which may be part of a camera array. For example, FIG. 3 may be an example partial cross-sectional view along D-D of FIG. 2. As shown in FIG. 3, the camera assembly 344 includes an optical module 377 positioned below a cover member 332 of a cover assembly 322. In the example of FIG. 3, the cover member 332 is substantially uniform in thickness and composition both over the optical module 377 and surrounding the optical module. However, this example is not limiting as shown in the examples of FIGS. 4 and 6 through 8. In some examples, the cover member 332 may be a front cover member or a rear cover member.

In some cases, the cover member 332 may be formed from a glass ceramic material. In additional cases, the cover member 332 may include one or more glass portions and one or more glass ceramic portions or may be formed from a glass ceramic layer in combination with one or more of a glass layer, a ceramic layer, or a polymer layer. The cover member 332 may be similar in composition, dimensions, and other properties to the cover members 132 and 232 and, for brevity, those details are not repeated here.

The camera assembly 344 of FIG. 3 also includes a support structure 386 which may be configured to hold various elements of the camera assembly 344 in place. For example, the optical module 377 may be mounted to the support structure 386. The camera assembly 344 may also include a circuit assembly 388, which may be mounted on a printed circuit board. The support structure 386 may also support the circuit assembly 388.

In some cases, the optical module 377 is configured to produce images from visible light. In these cases, the cover member 332 may have optical properties (e.g., haze, transmission, color) similar to those previously described with respect to the cover member 232 for camera assemblies configured to produce images from visible light. For brevity, this description is not repeated here. In some embodiments, the cover member 332 may have similar optical properties both over the optical module 377 (configured to produce images from visible light) and over the display.

In additional cases, the optical module 377 is configured to produce images from infrared light (e.g., near-IR light). The cover member 332 may have a transmission over an infrared wavelength range (e.g., from 770 nm to 1000 nm) greater than 85%, greater than 86%, greater than 87%, greater than 88%, greater than 89%, greater than 90%, greater than 91%, greater than 92%, greater than 93%, greater than 94%, or greater than 95%. In some cases, the cover member 332 may have a haze value less than 1%, from 0.05% to less than 1%, from 0.1% to less than 1%, from 0.2% to less than 1%, from 0.3% to less than 1%, from 0.4% to less than 1%, from 0.5% to less than 1%, from 0.6% to less than 1%, from 0.05% to 0.8%, from 0.1% to 0.8%, from 0.2% to 0.8%, from 0.3% to 0.8%, from 0.4 to 0.8%, from 0.05% to 0.6%, from 0.1% to 0.6%, from 0.2% to 0.6%, from 0.3% to 0.6%, from 0.05% to 0.5%, from 0.1% to 0.5%, from 0.2% to 0.5%, from 0.05% to 0.4%, from 0.1% to 0.4%, or from 0.2% to 0.4%. In some embodiments, the cover member 332 may have similar optical properties over the optical module 377 configured to produce images from infrared light as over the display. However, in other embodiments, the cover member 332 may have different optical properties over such an optical module 377 than over the display. For example, the cover member 332 may have a higher haze value and/or a lower transmission value for visible light over the optical module 377 than over the display (e.g., when the optical module 377 is configured to produce images from IR light). In some examples, a glass ceramic portion of the cover member positioned over the optical module 377 may have crystals which produce a greater amount of scattering than those of a glass ceramic portion of the cover member positioned over the display.

FIG. 4 schematically shows a partial cross-sectional view of a sensing array of an electrical device 400. The sensing array 418 includes a camera assembly 444, which may be part of a camera array. FIG. 4 may be an example partial cross-sectional view along D-D of FIG. 2. As shown in FIG. 4, the camera assembly 444 includes an optical module 477 positioned below a cover assembly 422. In the example of FIG. 4, the cover assembly 422 includes a cover member 432 which defines an opening 452 over the optical module 477. The cover assembly further includes a cover member 436 which defines a window over the optical module 477. In some cases, the cover member 436 has a lower haze and/or a higher transmission over a visible range than the cover member 432. In some examples, the cover member 432 may be a front cover member or a rear cover member.

In some cases, the cover member 432 may be formed from a glass ceramic material. In additional cases, the cover member 432 may include one or more glass portions and one or more glass ceramic portions or may be formed from a glass ceramic layer in combination with one or more of a glass layer, a ceramic layer, or a polymer layer. The cover member 432 may be similar in composition, dimensions, and one or more other properties to the cover members 132 and 232 and, for brevity, those details are not repeated here.

In some cases, the cover member 432 may have a relatively high transmission or transmittance over a visible wavelength range (e.g., from 400 nm to 700 nm) such as a transmission or transmittance greater than 80% and less than 90%, greater than 82% and less than 90%, greater than 84% and less than 90%, or greater than 85% and less than 90%. Similarly, the cover member 432 may have a relatively low haze value, such as a haze value from 0.2% to less than 1%, from 0.3% to less than 1%, from 0.4% to less than 1%, from 0.5% to less than 1%, from 0.6% to less than 1%, from 0.2% to 0.8%, from 0.3% to 0.8%, from 0.4% to 0.8%, from 0.05% to 0.6%, from 0.2% to 0.6%, from 0.3% to 0.6%, from 0.2% to 0.5%, or from 0.2% to 0.4%.

In other cases, at least a portion of the cover member 432 surrounding the cover member 436 may be configured to produce light scattering in the visible range. For example, this portion of the cover member 432 may be configured to have a variation in crystal size through the thickness in a similar fashion as previously described with respect to FIGS. 1A and 1B. This portion of the cover member 432 may appear translucent or may appear to have a depth effect. In some cases, this portion of the cover member 432 may have a transmission over the visible wavelength range which is less than 80% or from 20% to 75%. Alternately or additionally, the cover member 432 may have a haze value greater than about 1%, greater than about 2%, from 5% to 50%, from 5% to 75%, from 5% to 90%, from 20% to 50%, from 20% to 75%, from 20% to 90%, from 50% to 80%, or from 50% to 90%.

In some cases, the cover member 436 may be formed from one or more materials having a lower haze and/or a higher transmission over a specified wavelength range than the cover member 432. For example, the cover member 436 may be formed from a substantially transparent glass material, a substantially transparent glass ceramic material, or a substantially transparent ceramic material such as sapphire. In addition, the cover member 436 may be formed from one or more of a glass layer, a glass ceramic layer, a ceramic layer, or a polymer layer.

In cases where the optical module 477 is configured to produce images from visible light, the cover member 436 may have optical properties (e.g., haze, transmission, color) similar to those previously described with respect to the cover member 232 (for camera assemblies configured to produce images from visible light). In cases where the optical module 477 is configured to produce images from infrared light, the cover member 436 may have optical properties (e.g., haze and transmission) similar to those previously described with respect to the cover member 332 (for optical components configured to produce images from infrared light). For brevity, this description is not repeated here. The cover member 436 may be coupled to the cover member 432 using an adhesive, a mechanical coupling device, or a combination thereof.

The camera assembly 444 of FIG. 4 also includes a support structure 486 which may be configured to hold various elements of the camera assembly 444 in place. For example, the optical module 477 may be mounted to the support structure 486. The camera assembly 444 may also include a circuit assembly 488, which may be mounted on a printed circuit board. The support structure 486 may also support the circuit assembly 488.

FIG. 5 schematically shows a partial cross-sectional view of a sensing array of an electrical device 500. The sensing array 518 includes a reflectance sensor assembly 546. For example, FIG. 5 may be an example partial cross-sectional view along E-E of FIG. 2.

The electronic device 500 includes a sensor assembly 546 positioned below a cover assembly 522 and comprising an emitter module 582 and a receiver module 584. In some cases, the sensor assembly 546 may be configured to operate in a reflective sensing mode and the sensor assembly 546 is therefore a reflectance sensor assembly.

As an example, the reflectance sensor assembly may be a proximity sensor. The light-emitting module of a proximity sensor may produce infrared light. In some embodiments, the emitter module 582 produces near-infrared light such as light having a wavelength from about 800 nm to about 2.5 microns, from about 900 nm to about 1.6 microns, or from about 800 nm to about 1000 nm. In some cases, the proximity sensor may be a time of flight sensor.

As another example, the reflectance sensor assembly may be a Lidar sensor assembly which is configured to illuminate an object with light and then determine the distance to the object from the reflected light (e.g., a time of flight (TOF) sensor). In some cases, the emitter module 582 is a laser, which may be an infrared laser. A Lidar sensor can provide a digital three-dimensional representation of the object, which can be used for multiple applications, including augmented reality (AR) and virtual reality (VR). In addition, the reflectance sensor assembly may be a biometric identification sensor. For example, the reflectance sensor assembly may include an IR light-emitting module which projects a spatial pattern (e.g., a pattern of dots), a flood IR light-emitting (illuminating) module, and an IR camera.

FIG. 5 also schematically shows operation of the emitter module and the receiver module. For example, light 592 from the emitter module 582 (e.g., an optical signal) may be transmitted through the cover assembly 522 to an object 515 and light reflected from the object 515 (e.g., the optical signal reflected from the object) may be detected by the receiver module 584. In some cases, the receiver module 584 may receive only a portion of the light produced by the emitter module 582 (e.g., a first portion of the light).

The cover assembly 522 includes a cover member 532 which extends over the sensor assembly 546. In some cases, the cover member 532 may be formed from a glass ceramic material. In additional cases, the cover member 532 may include one or more glass portions and one or more glass ceramic portions or may be formed from a glass ceramic layer in combination with one or more of a glass layer, a ceramic layer, or a polymer layer. When the reflectance sensor is configured to emit and detect infrared light (e.g., near-IR light), the cover member 532 may have optical properties similar to those of the cover member 332 (when provided over an optical module configured to produce images from infrared light). The cover member 532 may be similar in composition, dimensions, and other properties to the cover members 132, 232, and 332 and, for brevity, those details are not repeated here.

As shown in FIG. 5, the emitter module 582 and the receiver module 584 may be spaced apart from the cover assembly 522 by a gap 561. The size of the gap 561 has been exaggerated in FIG. 5 to more conveniently illustrate the light path. The emitter module may include a light emitting element 581, which may be a light-emitting diode (LED) or a laser such as a vertical-cavity surface-emitting laser (VCSEL). The receiver module 584 may include a light receiving element 585, which may be a photodetector, which may include one or more photodiodes, phototransistors, or other optically sensitive elements. In addition, the emitter module 582 and the receiver module 584 may be supported by a support 587, which may include a circuit assembly or other supporting structure. It should be understood that the form of the support 587 is not limiting and that the sensor assembly 546 may include additional elements not shown in FIG. 5, such as circuitry and additional packaging for the emitter and receiver modules.

FIG. 6 shows an example cross-sectional view of a sensing array of an electronic device. FIG. 6 shows a sensing array 670 which may be located at the rear of the electronic device 600 and may be an example cross-sectional view along B-B of FIG. 1B. The sensing array 670, which may also be described as a rear-facing sensing array, includes a rear-facing camera array 675. At least one of the optical modules of the camera array 675 is configured to operate over a visible wavelength range. The electronic device 600 includes an enclosure 605 which comprises a rear cover assembly 624. The electronic device also includes an enclosure component 610 which defines a side surface of the electronic device. The enclosure component may include a member 612.

Figure 9A:
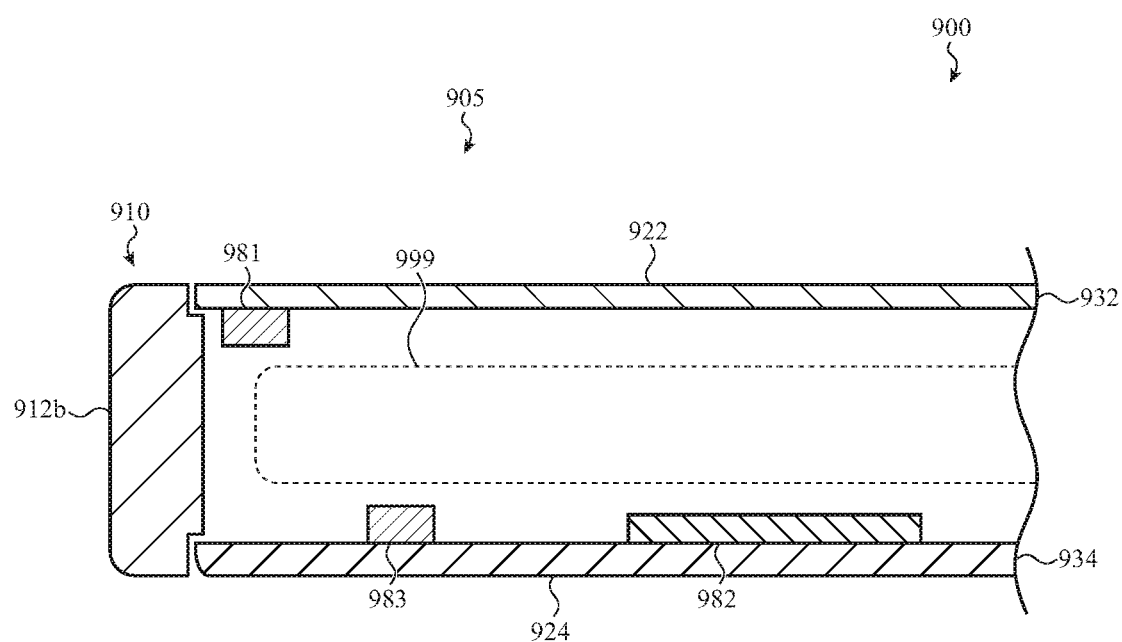
FIGS. 9A and 9B show partial cross-sectional views of an electronic device.

The rear cover assembly 624 includes a cover member 634. The sensing array 670 includes rear-facing optical modules 677 and 678. In the example of FIG. 6, the rear cover member 634 does not extend over the optical modules 667 and 668. Instead, the cover member 634 defines through-holes 667 and 668 and the optical modules 677 and 678 extend at least partially into these through-holes. Windows 687 and 688 extend over the optical modules 677 and 678 (and over the through-holes 667 and 668). The windows 687 and 688 may be formed of a transparent glass ceramic, a transparent ceramic such as sapphire, or glass. The rear cover member 634 may extend over a component of a wireless communication and/or charging system, as illustrated in FIG. 9A. The cover member 634 may include an external coating, an internal coating, or a combination thereof as described in more detail below.

The cover member 634 may be formed from a glass material, may be formed from a glass ceramic material, may include one or more glass portions and one or more glass ceramic portions, or may be formed from a glass ceramic layer in combination with one or more of a glass layer, a ceramic layer, or a polymer layer. In some cases, the cover member 634 includes a glass ceramic material.

The cover member 634 may be positioned over one or more internal components of the electronic device 600 and may also be configured to allow transmission of electromagnetic signals to and/or from the internal component. As an example, a glass ceramic material of the cover member 634 may be configured to be RF-transmissive and may have a dielectric constant suitable for use over a radio-frequency antenna or wireless charging system. In some cases, the material or combination of materials of the cover member 634 may have a dielectric constant (also referred to as the relative permittivity) having a value greater than or equal to 1 and less than 30, less than 20, less than 10, less than 7, or less than 5. In some cases, the dielectric constant may be from 3 to 7 or 4 to 8. In some cases, the loss tangent may range from about 0.002 to about 0.05, or from about 0.002 to about 0.025. In some cases, these values are maximum values while in other cases these values are measured at the frequency range(s) of interest. As an example, the frequency range of interest may be from about 5 GHz to about 40 GHz. These values may be measured at room temperature. As a further example, the glass ceramic material of the cover member 634 may have a magnetic permeability sufficiently low that it does not interfere with transmission of magnetic fields generated by the inductive coupling wireless charging system. In some cases, the cover member 634 may be substantially non-magnetic.

The cover member 634 may be substantially transparent, translucent, opaque or include transparent, translucent, and/or opaque portions. In some cases, the cover member 634 may have a haze greater than the cover member 632, such as greater than about 1%, greater than about 2%, from 5% to 50%, from 5% to 75%, from 5% to 90%, from 20% to 50%, from 20% to 75%, from 20% to 90%, from 50% to 80%, or from 50% to 90%. In addition, the cover member 634 may have optical properties (e.g., transmission/transmissivity) configured to allow transmission of an optical signal through the cover member 634. For example, when the sensing array 670 includes a sensor module that transmits an optical signal over a specified wavelength range through the cover member 634, the cover member 634 may have a transmission similar to that of the cover members 232, 332, 432, and 532 (for similar wavelength ranges).

In some cases, a glass ceramic portion or component may be configured to have smaller crystals near an exterior surface of the component than crystals in an interior and/or near an interior surface of the portion or component. For example, a glass ceramic portion or component may have a first crystal size in an exterior surface region (along the exterior surface) and a second crystal size, larger than the first crystal size, in an interior region of the glass ceramic portion or component. As examples, the interior region may be located along an interior surface of the portion or component or may be located away from the exterior and interior surfaces, such as an interior region location including a midpoint of the thickness of the portion or component. The smaller crystals may produce less scattering of visible light in the exterior surface region than in the interior region, creating a depth effect. In some cases, the difference in crystal size in the glass ceramic portion or component produces a haze value from 10% to 50%, from 10% to 75%, from 20% to 50%, from 20% to 75%, or from 50% to 80%.

The difference in crystal sizes may be achieved through creating regions of different crystal sizes through the thickness, through a gradient of crystal sizes from the exterior surface to the interior surface, or both. For example, the glass ceramic portion or component may include a gradient region between an exterior surface region and an interior region, with the gradient region having a crystal size gradient. The crystal size gradient may be uniform or may be stepped. As an example, crystals in an exterior surface region may have a size greater than zero and less than about 200 nm or about 100 nm. In addition, crystals in an interior surface region may have a size greater than about 200 nm and less than about 1.5 microns, greater than about 200 nm and less than about 1 micron, greater than about 200 nm and less than about 800 nm, greater than about 400 nm and less than 1 micron, or greater than about 600 nm and less than about 1.5 microns. These crystal sizes may be average crystal sizes in a given region of the glass ceramic component. In some cases, the thickness of the exterior surface region, the interior region, and/or the gradient region is at least 2 microns, at least 5 microns, at least 10 microns, or at least 20 microns. In embodiments, the difference in crystal sizes may be produced in a thicker portion of the glass ceramic component, such as in the thicker portion 627 of FIG. 6.

In the example of FIG. 6, the cover assembly 624 includes a thicker portion 627 and a thinner portion 625 and the sensing array 670 is generally located in the vicinity of the thicker portion 627. The thicker portion 627 is at least partially defined by a thicker portion of the cover member 634 and the thinner portion 625 is at least partially defined by a thinner portion of the cover member 634. The thicker portion 627 also defines a feature 657 that protrudes with respect to the thinner portion 625. The feature 657 is also referred to generally herein as a protruding region, as a protruding feature, or as a bump. The thicker portion of the cover member 634 at least partially defines the protruding feature 657.

The thinner portion 625 defines an exterior surface 626 (also referred to herein as a base surface). The thicker portion 627 defines an exterior surface 628 (also referred to herein as a raised surface or top surface). As an example, the exterior surface 628 may substantially define a plateau. Such an exterior surface may also be referred to herein as a (raised) plateau surface. The feature 657 protrudes with respect to the exterior surface portion 626.

In the example of FIG. 6, the through-holes 667 and 668 extend through the thicker portion 627 of the cover assembly 624. The size of through-holes 667 and 668 is exaggerated for convenience of illustration. Openings to the holes are located in the exterior surface 628. In some cases, the exterior surface 628 may have a texture configured to give an optical contrast with the texture of the exterior surface 626, as previously discussed with respect to FIG. 1B. In some cases, the raised surface 628 may have a root mean square height less than that of the surface 626, and in some cases may be a polished surface. The root mean square height of a polished surface in some cases may be from about 1 nm to about 125 nm, from about 1 nm to about 100 nm, from about 1 nm to about 75 nm, from about 1 nm to about 50 nm, from about 1 nm to about 25 nm, or from about 1 nm to about 10 nm. In some cases, the root mean square height of a surface configured to have a texture rougher than a polished surface may be from about 0.1 microns to about 2 microns, from about 0.1 microns to about 1.5 microns, from about 0.1 microns to about 1.25 microns, from about 0.1 microns to about 1.0 micron, from about 0.25 microns to about 2 microns, from about 0.25 microns to about 1.5 microns, from about 0.25 microns to about 1.25 microns, from about 0.25 microns to about 1.0 microns. The examples of root mean square heights for different surface textures provided with respect to FIG. 6 are generally applicable herein. However, in other cases, the exterior surface 628 may have a texture substantially the same as the texture of the surface 626. The through-holes may be referred to as a set of through-holes and in some cases may define an array of through-holes. Similarly, the openings may be referred to as a set of openings and in some cases may define an array of openings. A module such as a camera module, a sensor module, or an illumination module may be positioned below or within each opening of the set of openings. In addition, at least some of the modules may extend into respective through-holes of the set of through-holes.

The electronic device 600 further includes a camera array 675. The cross-section view of FIG. 6 shows two optical modules (677, 678) of the camera array 675. The camera array 675 further includes a support structure 671. The support structure 671 may be configured to hold various elements of the camera array 675 in place. For example, each of the optical modules 677 and 678 may be mounted to the support structure 671. In the example of FIG. 6, the support structure 671 includes a bracket 672 that has a non-planar profile. The shape of the bracket 672 is not limited to the example of FIG. 6 and in other examples may have the form of a flat element. The bracket 672 may be coupled to an interior surface of the cover assembly 624. In the example of FIG. 6, the support structure 671 also includes a frame 673 which nests at least partially within the bracket 672 and supports a circuit assembly 674, which may be mounted on a printed circuit board. However, this example is not limiting and in additional embodiments the frame 673 may be omitted. The support structure 671 and the coupling between the camera array 675 and the interior surface 642 of the cover assembly 624 may be configured to limit bending of the cover member 634 in the vicinity of the protruding feature 657.

The first optical module 677 and the second optical module 678 are respectively aligned with the through-holes 667 and 668. As shown in FIG. 6, the first optical module 677 extends substantially through the through-hole 667 and the second optical module 678 extends substantially through the through-hole 668. In the example of FIG. 6, an end of each of the optical modules 677 and 678 extends beyond (protrudes beyond) the surface 628. In additional examples, an end of an optical module may be flush or recessed with respect to the surface portion 628. In some cases, an electronic device may include at least one optical module that is flush with or extends beyond the surface portion 628 and another optical module that is recessed with respect to the surface portion 628.

As previously described with respect to FIGS. 1A through 4, an optical module may comprise a camera module, an illumination module, an optical sensor or the like. Typically, the camera array 675 includes at least one camera module and may include two, three, four, or five camera modules. The camera modules are electrically connected to the circuit assembly 674. As shown in FIG. 6, separate windows 687 and 688 are provided over the through-holes 667 and 668 and the retaining components 686 hold the windows 687 and 688 in place. For example, the retaining component 686 may be a ring, such as a metal ring, which surrounds the end of the optical module. Alternately, an optical module may include a window as part of its optical components, with the window being positioned within its housing. The windows may protect underlying components (e.g., cameras, lenses, other sensors), and may define part of the exterior surface 644 of the cover assembly 624.

FIG. 6 shows a coating 660 provided along an interior surface 652 of the cover member 634. In some cases, the coating 660 may provide the cover assembly 624 with a desired color. In additional cases, the coating 660 may function as a masking layer.

As shown in FIG. 6, the camera array 675 is coupled to the coating 660. In examples where the coating 660 does not extend under the protruding feature 657, the camera array 675 may be coupled more directly to the interior surface 652 of the cover member 634. In some cases, the camera array 675 may be coupled to the interior surface 642 of the cover assembly 624 with an adhesive bond, as may be provided by an adhesive layer. As an additional example, the camera array 675 may be coupled to the interior surface 642 of the cover assembly 624 with a fastener or other form of mechanical attachment.

In some cases, the coating 660 comprises a polymer. The coating 660 may comprise at least 40%, 50%, 60%, or 70% of the polymer and may therefore be referred to as a polymer-based coating or a polymeric coating. When the coating 660 further comprises a colorant, the polymer may act as a binder for the colorant. The colorant (e.g., a pigment) may be substantially dispersed in a matrix of the polymer. As examples, the polymer may be polyester-based, epoxy-based, urethane-based, or based on another suitable type of polymer or copolymer. The coating 660 may further comprise optional additives such as one or more extenders, diluents, polymerization initiators, and/or stabilizers. In some embodiments, the polymer has a crosslinked structure.

In some cases, the coating 660 may include a color layer (e.g., an ink, dye, paint, etc.) and/or a metal layer. As previously described, the coating 660 may include at least one color layer. The color layer may comprise a polymer and a colorant dispersed in the polymer and may be transparent, translucent, or opaque. More generally, any pigment, paint, ink, dye, sheet, film, or other layer may be used as the coating 660 or a portion thereof. In some embodiments, the coating 660 is a multilayer coating that includes a first color layer and a second color layer. Each of the color layers may be transparent, translucent, or opaque. Each of the color layers may include the same colorant or different color layers may include different colorants. The thickness of each of the color layers in the coating 660 may be from about 2 microns to about 10 microns. In further embodiments, the coating 660 may comprise a metal layer in addition to one or more color layers.

The electronic device further includes a front cover assembly 622 and a cover member 632 which may have similar properties to the cover assemblies and cover members previously discussed with respect to FIGS. 1A through 5, and, for brevity, those details are not repeated here. The electronic device 600 further includes a display 664 and a touch sensor 662 provided below the front cover assembly 622. The display 664 and the touch sensor 662 may be coupled to the front cover assembly 622. The display 664 may be a liquid-crystal display (LCD), a light-emitting diode (LED) display, an LED-backlit LCD display, an organic light-emitting diode (OLED) display, an active layer organic light-emitting diode (AMOLED) display, and the like. The touch sensor 662 may be configured to detect or measure a location of a touch along the exterior surface of the front cover assembly 622. The electronic device may further include a front-facing camera as shown in FIG. 1A.

Each of the cover assembly 622 and the cover assembly 624 is coupled to an enclosure component 610, such as with an adhesive, a fastener, or a combination thereof (schematically indicated by coupling elements 692 and 694). The enclosure component 610 may be similar to the enclosure component 110 of FIG. 1A. The enclosure component 610 at least partially defines an interior cavity 601 of the electronic device 600.

FIG. 7 shows an example cross-sectional view of another sensing array of an electronic device. FIG. 7 shows a sensing array 770 which may be located at the rear of the electronic device 700 and may be an example cross-sectional view along B-B of FIG. 1B. The sensing array 770 includes a camera array 775. The electronic device 700 includes an enclosure 705 which comprises a front cover assembly 722 and a rear cover assembly 724. The electronic device also includes an enclosure component 710.

The rear cover assembly 724 includes a first cover member 734 which may extend over a component of a wireless communication system and/or a wireless charging system. The rear cover assembly 724 also includes a second cover member 736 which extends over multiple optical modules of the sensing array. The second cover member 736 defines a window over the optical modules 777 and 778 and may also define a window over additional optical modules of the sensing array 770. The portion of the rear cover assembly 724 including the second cover member 736 is thicker than the portion including the first cover member 734. As a result, the second cover member 736 is offset with respect to the first cover member 734. A coupling ring 785 may couple the cover member 736 to the cover member 734. The coupling ring 785 may be formed of a metal material or another suitable material.

The first cover member 734 may define an opening 765 and an insert 738 may be positioned in this opening. The insert 738 defines through-holes 767 and 768 and the optical modules 777 and 778 extend at least partially into these through-holes. The protruding feature 757 is defined by the insert 738, the second cover member 736, and coupling ring 785. The size of through-holes 767 and 768 is exaggerated for convenience of illustration. The insert 738 may also be coupled to the coupling ring, to the first cover member 734, or both such as with an adhesive.

Similarly to the cover member 634, the first cover member 734 may be formed from a glass material, may be formed from a glass ceramic material, may include one or more glass portions and one or more glass ceramic portions, or may be formed from a glass ceramic layer in combination with one or more of a glass layer, a ceramic layer, or a polymer layer. In some cases, the cover member 734 includes a glass ceramic material. The optical, electrical, and magnetic properties of the first cover member 734 may be similar to those previously described for the cover member 634. In addition, the first cover member 734 may have a texture similar to that previously described for the cover member 634.

In some cases, the cover member 736 is substantially transparent and has a lower haze and/or a higher transmission over a visible range than the cover member 734. In additional cases, the cover member 736 may include translucent or opaque portions. When the cover member 736 defines a window over one or more optical components, the optical properties of the cover member 736 may be determined in part by the wavelength range(s) over which the optical component(s) are configured to operate. For example, the optical component (s) may be configured to operate over a visible wavelength range, a near-IR range, or both. For example, the cover member 736 may have one or more optical properties similar to those described for the cover members 232 and 436.

In some embodiments, the cover member 736 may be formed from a glass material or one or more glass layers in combination with one or more of a glass ceramic layer, a ceramic layer, or a polymer layer. In additional embodiments, the cover member 736 is formed from a glass ceramic material or one or more glass ceramic layers in combination with one or more of a glass layer, a ceramic layer, or a polymer layer. In further embodiments, the cover member 736 is formed from a ceramic material such as sapphire.

In some cases, the insert 738 is substantially transparent, translucent, or opaque. In some embodiments, the insert 738 may be formed from a glass material or one or more glass layers in combination with one or more of a glass ceramic layer, a ceramic layer, or a polymer layer. In additional embodiments, the insert 738 is formed from a glass ceramic material or one or more glass ceramic layers in combination with one or more of a glass layer, a ceramic layer, or a polymer layer. In further embodiments, the insert 738 is formed from a ceramic material.

In additional embodiments, a unitary cover member formed from a single piece of material (rather than the separate cover members 734 and 736 and insert 738 shown in FIG. 7) may extend over one or more optical modules of the sensing array and over other components of the electronic device. Such a unitary cover member may also be referred to as a monolithic cover member. In some cases, such a cover member may include a first portion having a shape similar to that of the first cover member 734. For example, the first portion may define a substantially planar region surrounding the sensing array. In addition, such a cover member may include a second portion having a shape similar to that of the second cover member 736. For example, the second portion may define a substantially planar region extending over the optical module(s) of the sensing array and offset with respect to the first portion. This cover member may also include a third portion extending between the first portion and the second portion. Such a unitary cover member may be formed of a glass ceramic material or may include one or more glass ceramic layers in combination with one or more of a glass layer, a ceramic layer, or a polymer layer as previously described with respect to FIGS. 1A and 1B.

In some cases, such a unitary cover member may have optical properties similar to those of the cover member 736 and electrical and magnetic properties similar to those of the cover member 734 across all three portions. In additional cases, this cover member may include different optical properties in the different portions. For example, this cover member may include substantially transparent portions extending over one or more optical modules of the sensing array and may also include one or more translucent or opaque portions, which may be similar to the translucent or opaque portions previously described with respect to FIGS. 1A and 1B.

The camera module 775 and the optical modules 777 and 778 may be similar to the camera module 675 and the optical modules 677 and 678. In addition, the support structure 771, the bracket 772, the frame 773, and the circuit assembly 774 may be similar to the support structure 671, the bracket 672, the frame 673, and the circuit assembly 674. The front cover assembly 722, the cover member 732, the display 764, the touch sensor 762, the enclosure component 710, the coupling elements 792 and 794, and the interior cavity 701 may be similar to the front cover assembly 622, the cover member 632, the display 664, the touch sensor 662, the enclosure component 610, the coupling elements 692 and 694, and the interior cavity 601. The portions 725 and 727, the surfaces 726 and 728, the protruding feature 757, the through-holes 767 and 768, the external surface 744, and the internal surface 742 of the rear cover member 724 may be similar to the portions 625 and 627, the surfaces 626 and 628, the protruding feature 657, the through-holes 667 and 668, the external surface 644, and the internal surface 642 of the rear cover member 624. The internal surface 752 of the rear cover member 734 and the coating 760 may be similar to the internal surface 652 of the rear cover member 634 and the coating 660. For brevity, these details are not repeated here.

FIG. 8 shows an example cross-sectional view of another sensing array of an electronic device. FIG. 8 shows a sensing array 870 which may be located at the rear of the electronic device 800 and may be an example cross-sectional view along B-B of FIG. 1B. The sensing array 870 includes a camera array 875. The electronic device 800 includes an enclosure 805 which comprises a front cover assembly 822 and a rear cover assembly 824. The electronic device also includes an enclosure component 810.

The rear cover assembly 824 includes a first cover member 834 which may extend over a component of a wireless communication system and/or a wireless charging system. The rear cover assembly 824 also includes a second cover member in the form of an insert 838. A coupling ring 885 couples the first cover member 834 to the insert 838. In some cases, an adhesive may also be used to couple the first cover member 834 to the insert 838. The first cover member 834 may define an opening 865 and the insert 838 may be positioned in this opening. The portion of the rear cover assembly 824 including the insert 838 is thicker than the portion including the first cover member 834. Further, the protruding feature 857 is defined by the insert 838 and the coupling ring 885.

The camera array 875 includes two optical modules (877, 878). The insert 838 defines through-holes 867 and 868 and the optical modules 877 and 878 extend at least partially into these through-holes. The coupling ring 885 may be similar to the coupling ring 785. The size of through-holes 867 and 868 is exaggerated for convenience of illustration.

Similar to the cover members 634 and 734, the cover member 834 may be formed from a glass material, may be formed from a glass ceramic material, may include one or more glass portions and one or more glass ceramic portions, or may be formed from a glass ceramic layer in combination with one or more of a glass layer, a ceramic layer, or a polymer layer. In some cases, the cover member 834 includes a glass ceramic material. The optical, electrical, and magnetic properties of the cover member 834 may be similar to those previously described for the cover member 634.

In some embodiments, the insert 838 may be formed from a glass material or one or more glass layers in combination with one or more of a glass ceramic layer, a ceramic layer, or a polymer layer. In additional embodiments, the insert 838 is formed from a glass ceramic material or one or more glass ceramic layers in combination with one or more of a glass layer, a ceramic layer, or a polymer layer. The insert 838 may also include one or more other durable materials such metals, ceramics, and the like.

In some cases, the insert 838 may be substantially transparent, translucent, or opaque. The insert 838 may have one or more optical properties similar to those of the insert 738 and, for brevity, those details are not repeated here. In a similar fashion as previously described with respect to FIGS. 1B and 6, in some cases, the surface 828 (defined by the insert 838) may have a different texture than the surface 826 (defined by the cover member 834) while in other cases, the surface 828 may have a texture substantially the same as the texture of the surface 826. For example, the surface 828 may have a root mean square height less than that of the surface 826 and in some cases may be a polished surface. The examples of root mean square heights for different surface textures provided with respect to FIG. 6 are applicable to the surfaces 828 and 826 and are not repeated here for brevity.

The camera module 875, the optical modules 877 and 878, the windows 887 and 888, and the retaining components 886 may be similar to the camera module 675, the optical modules 677 and 678, the windows 687 and 688, and the retaining components 686. In addition, the support structure 871, the bracket 872, the frame 873, and the circuit assembly 874 may be similar to the support structure 671, the bracket 672, the frame 673, and the circuit assembly 674. The front cover assembly 822, the cover member 832, the display 864, the touch sensor 862, the enclosure component 810, the coupling elements 892 and 894, and the interior cavity 801 may be similar to the front cover assembly 622, the cover member 632, the display 664, the touch sensor 662, the enclosure component 610, the coupling elements 692 and 694, and the interior cavity 601. The portions 825 and 827, the surfaces 826 and 828, the protruding feature 857, the through-holes 867 and 868, the external surface 844, and the internal surface 842 of the rear cover assembly 824 may be similar to the portions 625 and 627, the surfaces 626 and 628, the protruding feature 657, the through-holes 667 and 668, the external surface 644, and the internal surface 642 of the rear cover member 624. The internal surface 852 of the rear cover member 834 and the coating 860 may be similar to the internal surface 652 of the rear cover member 634 and the coating 660. For brevity, these details are not repeated here.

Figure 9B:
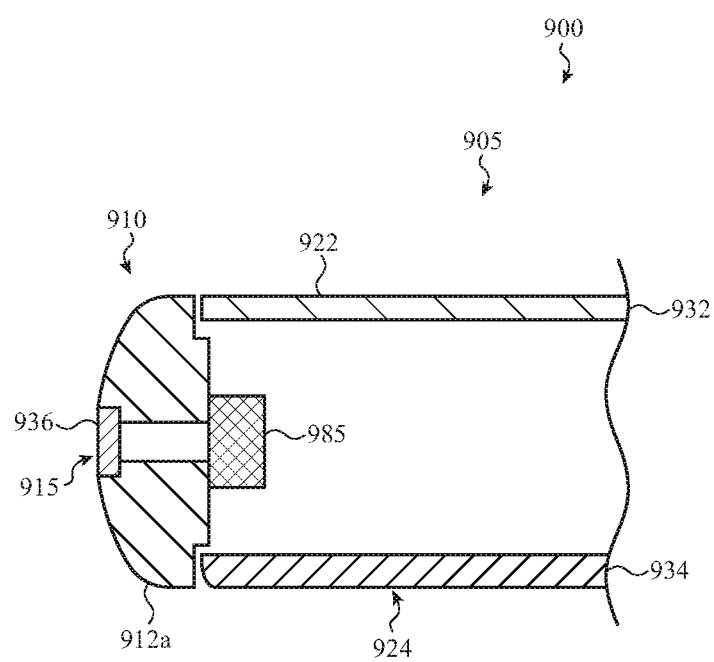

FIGS. 9A and 9B show partial cross-sectional views of an electronic device. FIG. 9A may be an example of a partial cross-sectional view along C-C of FIG. 1B and FIG. 9B may be an example of a partial cross-sectional view along A-A of FIG. 1A. As shown in FIGS. 9A and 9B, the electronic device 900 includes internal device components 981, 982, 983, and 985 positioned within the enclosure 905. As an example, the device components 981, 983, and 985 may be part of a wireless communication system and the device component 982 may be part of a wireless charging system. Additional device components 999 are indicated schematically with a dashed line and may include one or more of the components described with respect to FIG. 12.

The cover assembly 922 includes a cover member 932 which extends over the internal device component 981. In some cases, the cover member 932 may be formed from a glass ceramic material. In additional cases, the cover member 934 may include one or more glass portions and one or more glass ceramic portions or may be formed from a glass ceramic layer in combination with one or more of a glass layer, a ceramic layer, or a polymer layer. The cover member 932 may be substantially transparent, or include transparent, translucent, and/or opaque portions. The cover member 932 may have similar optical properties to the cover member 632 and, for brevity that description is not repeated here.

The device component 981 may be part of a wireless communication system and in some cases may be a directional antenna (assembly). By the way of example, the device component 981 may have a primary transmission direction which is substantially perpendicular to the front surface of the electronic device. The device component 981, as well as the device components 983, and 985 may be similar to the device components 181, 183, and 185 and may be operated at similar frequency ranges. For example, the device components 981, 983, and 985 may be compatible with a 5G wireless protocol (including millimeter wave and/or 6 GHz communication signals). In some cases, the device components 981, 983, and 985 may be configured to transmit wireless signals at a frequency band between about 25 GHz and 39 GHz.

The cover assembly 924 includes a cover member 934 which extends over the internal device components 982 and 983. In some cases, the cover member 934 may be formed from a glass or a glass ceramic material. In additional cases, the cover member 934 may include one or more glass portions and one or more glass ceramic portions or may be formed from a glass ceramic layer in combination with one or more of a glass layer, a ceramic layer, or a polymer layer. The rear cover member 934 may be substantially transparent, translucent, opaque or include transparent, translucent, and/or opaque portions. The cover member 934 may have similar optical properties to the cover member 634 and, for brevity, that description is not repeated here.

When the device component 982 is part of an inductive coupling wireless charging system, the cover member 934 may be formed from a material (or combination of materials) having a magnetic permeability sufficiently low that it does not interfere with transmission of magnetic fields generated by the inductive coupling wireless charging system. For example, the component of an inductive coupling wireless charging system may include a wireless receiver component such as a wireless receiver coil or other feature of the wireless charging system. The cover member 934 may have similar magnetic properties to the cover member 634.

The device component 983 may be part of a wireless communication system and in some cases may be a directional antenna (assembly). By the way of example, the device component 983 may have a primary transmission direction which is substantially perpendicular to the rear surface of the electronic device. The cover member 934 may therefore be configured to provide electrical properties suitable for use over the component of a wireless communication system. For example, the cover member 934 may be a dielectric cover member and may be formed from a material having a dielectric constant and a dissipation factor sufficiently low to allow transmission of RF or IR (e.g., near-IR) signals through the cover member. The cover member 934 may have similar dielectric properties to the cover member 634 and the wireless communication system may be as previously described with respect to FIGS. 1A and 1B. For brevity, these details are not repeated here.

As shown in FIG. 9B, the enclosure 905 also includes a cover assembly 915. In some cases, the cover assembly 915 may provide a window for a device component 985. For example, the cover assembly 915 may define an antenna window for transmitting and receiving wireless signals. For example, the cover assembly 915 may be configured to transmit wireless signals at one or more of the frequencies previously discussed with respect to the device components 181, 183, and 185. For example, the cover assembly 915 may be configured to transmit wireless signals at a frequency band between about 25 GHz and 39 GHz.

The cover assembly 915 may include a cover member 936. The cover member 936 may be formed from a dielectric material. In some cases, the cover member 936 may be formed from a glass ceramic material, may include one or more glass ceramic portions, or may be formed from a glass ceramic layer in combination with one or more of a glass layer, a ceramic layer, or a polymer layer. In additional cases, the cover member 936 may be formed from a glass material, a ceramic material, a polymeric material, or combinations thereof. The cover member 936 may include one or more glass ceramic portions or may be formed from a glass ceramic layer in combination with one or more of a glass layer, a ceramic layer, or a polymer layer. The cover member 936 may be substantially transparent, translucent, opaque, or include transparent, translucent and/or opaque portions. The cover member 936 may have similar optical properties to the cover member 634 and, for brevity that description is not repeated here.

The device component 985 may be part of a wireless communication system and in some cases may be a directional antenna (assembly). By the way of example, the device component 985 may have a primary transmission direction which is substantially perpendicular to the side surface of the electronic device.

The enclosure 905 of the electronic device 900 also includes an enclosure component 910. The enclosure component 910 includes members 912a and 912b. The members 912a and 912b may be formed of metal or another electrically conductive material. Alternately, the members 912a and 912b may be formed from any of the materials described for the members 112a, 112b, 112c, and 112d of FIGS. 1A and 1B.

FIG. 10 shows another example electronic device including a sensing array, which is also referred to as a sensing panel. The electronic device 1000 may be a wearable electronic device such as watch and the sensing panel 1070 may be located at the rear of the electronic device.

The electronic device 1000 includes a rear cover assembly 1024. In the example of FIG. 10, the rear cover assembly 1024 comprises a cover member 1036 positioned over at least a portion of the sensing panel 1070. The rear cover assembly also comprises a cover member 1034. The rear cover assembly 1024 may at least partially define a rear surface 1004 of the wearable electronic device 1000. For example, the rear surface 1004 of the wearable electronic device may contact the skin of a user when the device is worn. An electrode 1054 may be positioned along the rear surface 1004 and contact the skin of a user wearing the device. The electronic device 1000 further includes an enclosure component 1010 and input devices 1003 and 1007. The electronic device also typically includes a front cover assembly and a display, as discussed in further detail below.

As shown in FIG. 10, the electronic device comprises a sensing panel 1070. The sensing panel 1070 may include one or more sensor assemblies. For example, the one or more sensor assemblies may be one or more health monitoring sensor assemblies or biosensor assemblies, such an electrocardiogram (ECG) sensor, a photoplethysmogram (PPG) sensor, a heart rate sensor, a pulse oximeter or other oxygen sensor, or other bio-sensor. In some cases, a sensor assembly is configured to illuminate the tissue of the user wearing the device and then measure light that is transmitted back to the device.

In the example of FIG. 10, the sensing panel 1070 includes four optical modules 1082 and four optical modules 1083. In some examples, the optical modules 1082 are configured to emit a first optical signal and the optical modules 1083 are configured to detect a second optical signal transmitted back to the device. For example, the second optical signal may include light from the first optical signal that is reflected back to the device 1000, also referred to as a reflection of the first optical signal. The example of FIG. 10 is not limiting, and the electronic device may include a greater or a lesser number of optical modules. Further, the arrangement of emitter modules and receiver modules is not limited to that shown in FIG. 10.

The electronic device may include one or more optical modules which emit light, also referred to herein as an emitter module. An emitter module may emit light over at least a portion of the visible spectrum (e.g., green light and/or red light), in which case the optical signal may be a visible (light) signal. Alternately or additionally, the emitter module may emit light over a near-IR wavelength range, in which case the optical signal may be a near-IR (light) signal.

In some embodiments, the sensing array includes a biosensor assembly which includes one or more emitter modules and one or more receiver modules. For example, a heart rate biosensor may include an emitter module which produces a visible light signal (e.g., green light) and which produces an infrared light signal. As another example, a pulse oximetry biosensor (e.g., an $SpO_2$ sensor) may include an emitter module which produces an optical signal over a wavelength range at which the absorption of oxygenated hemoglobin and deoxygenated hemoglobin is different (e.g., red light) and which produces an optical signal over a wavelength range at which the absorption of oxygenated hemoglobin and deoxygenated hemoglobin is similar (e.g., green light or infrared light). The biosensor assembly may include a chassis positioned below the cover assembly 1024 and the emitter module(s) and receiver module(s) may be attached to the chassis.

In some examples the cover member 1036 may be positioned over the optical modules 1082 and 1083 (and the cover member 1036 may act as a window for the optical modules 1082 and 1083). In other examples, the cover member 1036 may define openings which are positioned over the optical modules 1082 and 1083 and additional cover members may be placed in or over the openings (and act as windows for the for the optical modules 1082 and 1083).

In some cases, the cover member 1036 may be formed of a glass ceramic material. The glass ceramic cover member may be substantially transparent or may include transparent portions and translucent portions. The cover member 1036 may have optical properties suitable for use over optical components configured to operate over a visible wavelength range and a near-IR wavelength range. These optical properties may be similar to those described for the cover member 734 or for other cover members described herein. In some cases, the cover member 1034 may be translucent or opaque or include translucent or opaque portions. The cover member 1036 may be formed of a glass ceramic material, a ceramic material, a glass material, or combinations thereof as previously described with respect to FIGS. 1A and 1B.

As shown in FIG. 10, the enclosure 1005 includes an enclosure member 1010 that defines a curved side surface 1006 that extends from the bottom surface to a top surface of the electronic device. In some cases, the rear surface 1004 of the electronic device 1000 may be substantially flat while in other cases the cover member 1036 may define a convex outer contour. A band 1050 may be attached to the housing and configured to secure the wearable electronic device to a user (in FIG. 10, the band 1050 is curved to show the rear surface 1004). The enclosure 1005 may define a cavity and the enclosure member 1010 may define an opening to the cavity.

A display, such as a touch-sensitive display, may be at least partially disposed within the cavity and may have a viewable area. The device may also include a front cover member disposed above the display and including a flat middle portion larger than the viewable area of the display, and a curved edge portion surrounding the flat middle portion and coinciding with the curved side portion along a perimeter of the cavity to form a continuous contoured surface. In some cases, the front cover member may be formed from a glass ceramic material. The front cover member may have similar optical properties to the cover members 132 and 232 (as suitable for use over an optical component configured operate over a visible wavelength range). For brevity, that description is not repeated here.

The electronic device 1000 may further include a crown module that is positioned at least partially within an aperture formed within the curved side portion of the housing. The crown module may include an input member 1003 (e.g., a dial) having an outer surface configured to receive a rotary user input. The crown module may be offset with respect to a centerline of the housing between the top portion and the flat bottom portion. The offset may be toward the top portion of the housing. The crown module may include a dial having a portion that is higher than an interface between the cover and the housing.

FIGS. 11A and 11B show views of an additional example electronic device including a sensing array. FIG. 11B shows a sensing array 1170 which may be located at the rear of the electronic device 1100. The sensor array 1170 is associated with a protruding feature 1157 of the enclosure 1105.

The electronic device 1100 includes an enclosure 1105 which comprises a front cover assembly 1122 and a rear cover assembly 1124. The enclosure 1105 also includes an enclosure component 1110. In a similar fashion as described for FIG. 1B, a thicker portion of the rear cover assembly 1124 defines a protruding feature 1157. The sensing array 1170 is located at this thicker portion of the rear cover assembly 1124. The enclosure 1105 defines a front surface 1102, a rear surface 1104, and a side surface 1106 of the electronic device 1100.

The sensing array 1170 includes a sensor module 1154 and camera module 1152. The sensor module 1154 may be an ambient light sensor, a Lidar sensor, or any of the optical sensor modules previously described with respect to FIG. 1B. Each of the camera modules 1152 may be configured to operate over a visible wavelength range. The description of camera modules previously provided with respect to FIGS. 1A and 1B is generally applicable herein, and, for brevity, is not repeated here. The sensing array 1170 also includes another sensor component 1153 such as a microphone, a smaller optical component (e.g., a flash), and the like.

The rear cover assembly 1124 comprises a cover member 1134 and a cover member 1136. The cover member 1134 extends over an internal component 1182 of the electronic device. The cover member 1134 may be configured to allow transmission of electromagnetic signals to and/or from the internal component 1182. In some cases, the internal component 1182 is part of a wireless communication system. For example, the internal component 1182 may be an antenna configured to radiate an RF signal. The antenna and the wireless communication system may be any of antennas and wireless communication systems previously described with respect to FIGS. 1A and 1B.

In some cases, the cover member 1134 may be formed from a glass material, may be formed from a glass ceramic material, may include one or more glass portions and one or more glass ceramic portions, or may be formed from a glass ceramic layer in combination with one or more of a glass layer, a ceramic layer, or a polymer layer. In some cases, the cover member 1134 includes a glass ceramic material. The optical, electrical, and magnetic properties of the cover member 1134 may be similar to those previously described for the cover members 634, 734, or 834 or other cover members described herein. In additional cases, the cover member 1134 may be formed from a metal material and integrated with the enclosure member 1110. In such cases, an additional RF-transmissive cover member may be provided over the internal component 1182 if desired.

In some cases, the second cover member 1136 extends over the sensor module 1154 and camera module 1152 of the sensing array in a similar fashion as previously shown in FIG. 7. In other cases, the second cover member 1136 may define through-holes and the sensor module 1154 and camera module 1152 may extend into the through-holes as previously shown in FIG. 8. The cover member 1136 at least partially defines the protruding feature 1157, as previously described with respect to FIG. 7. A coupling ring 1185 may couple the cover member 1136 to the cover member 1134. The cover member 1136 may have a similar composition and optical and electrical/magnetic properties to the cover member 736. For brevity, these details are not repeated here. In additional embodiments, a monolithic cover member 1134 may define the protruding feature 1157 in a similar fashion as described for FIG. 6.

The front cover assembly 1122 is positioned over a display 1142 and may provide a substantially transparent window through which the display may be viewed. The front cover assembly 1122 comprises a cover member 1132 which may be formed from or which may include a glass ceramic material. In some cases, the cover member 1132 may have a similar composition and optical properties as described for the cover members 122 and 222 and, for brevity, this description is not repeated here.

The enclosure component 1110 comprises multiple members. The members 1112a, 1112b, 1112c, and 1112d may be formed of metal or another electrically conductive material. Alternately, the members 1112a, 1112b, 1112c, and 1112d may be formed from any of the materials described for the members 112a, 112b, 112c, and 112d of FIGS. 1A and 1B. The members 1114 and 1115 may be formed of a polymer or another dielectric material, as previously described for the members 114a, 114b, 114c, and 114d of FIGS. 1A and 1B. The electronic device further comprises input devices 1137 and 1138, which may be similar to the input devices 152 and 154 described with respect to FIGS. 1A and 1B. For brevity, that description is not repeated here.

Figure 12:
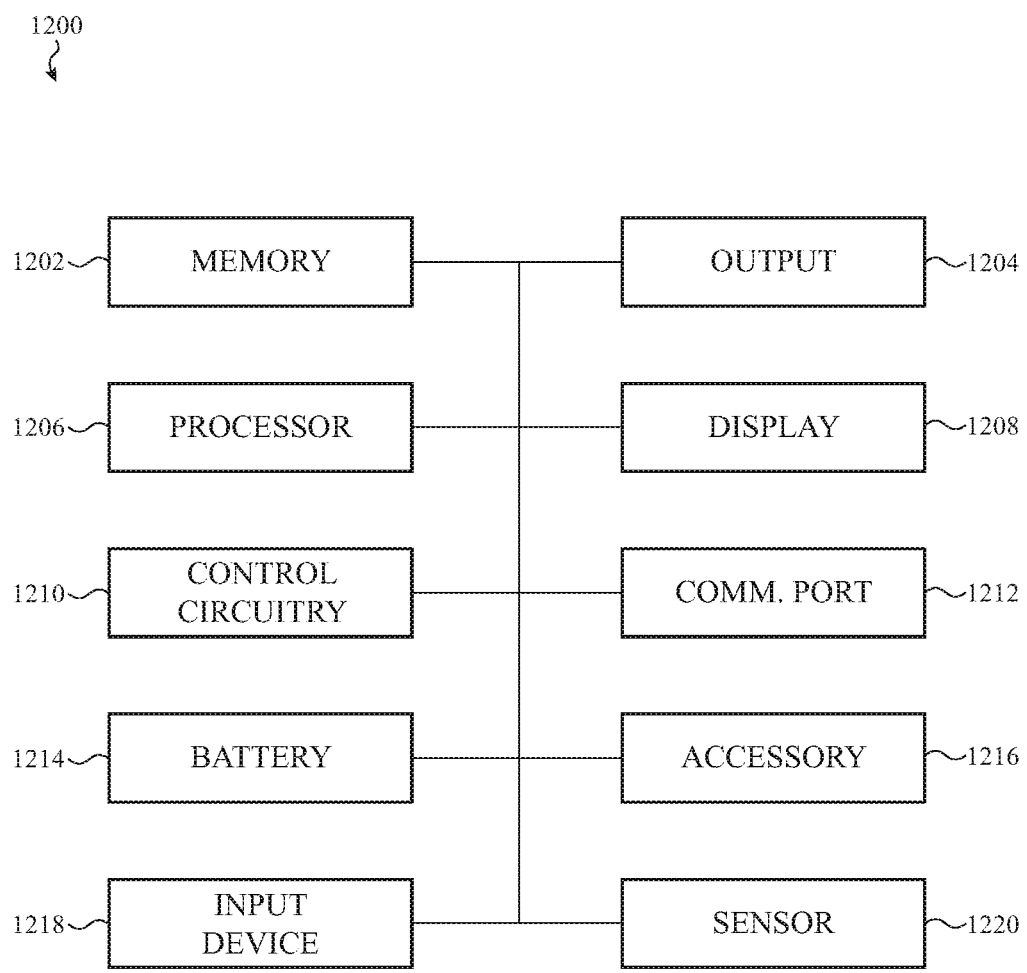
FIG. 12 shows a block diagram of a sample electronic device incorporating a glass ceramic component.

FIG. 12 shows a block diagram of a sample electronic device that can incorporate a component comprising a glass ceramic material as described herein. The schematic representation depicted in FIG. 12 may correspond to components of the devices depicted in FIGS. 1A to 11B as described above. However, FIG. 12 may also more generally represent other types of electronic devices including a component comprising a glass ceramic material as described herein.

In embodiments, an electronic device 1200 may include sensors 1220 to provide information regarding configuration and/or orientation of the electronic device in order to control the output of the display. For example, a portion of the display 1208 may be turned off, disabled, or put in a low energy state when all or part of the viewable area of the display 1208 is blocked or substantially obscured. As another example, the display 1208 may be adapted to rotate the display of graphical output based on changes in orientation of the device 1200 (e.g., 90 degrees or 180 degrees) in response to the device 1200 being rotated.

The electronic device 1200 also includes a processor 1206 operably connected with a computer-readable memory 1202. The processor 1206 may be operatively connected to the memory 1202 component via an electronic bus or bridge. The processor 1206 may be implemented as one or more computer processors or microcontrollers configured to perform operations in response to computer-readable instructions. The processor 1206 may include a central processing unit (CPU) of the device 1200. Additionally, and/or alternatively, the processor 1206 may include other electronic circuitry within the device 1200 including application specific integrated chips (ASIC) and other microcontroller devices. The processor 1206 may be configured to perform functionality described in the examples above.

The memory 1202 may include a variety of types of non-transitory computer-readable storage media, including, for example, read access memory (RAM), read-only memory (ROM), erasable programmable memory (e.g., EPROM and EEPROM), or flash memory. The memory 1202 is configured to store computer-readable instructions, sensor values, and other persistent software elements.

The electronic device 1200 may include control circuitry 1210. The control circuitry 1210 may be implemented in a single control unit and not necessarily as distinct electrical circuit elements. As used herein, "control unit" will be used synonymously with "control circuitry." The control circuitry 1210 may receive signals from the processor 1206 or from other elements of the electronic device 1200.

As shown in FIG. 12, the electronic device 1200 includes a battery 1214 that is configured to provide electrical power to the components of the electronic device 1200. The battery 1214 may include one or more power storage cells that are linked together to provide an internal supply of electrical power. The battery 1214 may be operatively coupled to power management circuitry that is configured to provide appropriate voltage and power levels for individual components or groups of components within the electronic device 1200. The battery 1214, via power management circuitry, may be configured to receive power from an external source, such as an alternating current power outlet. The battery 1214 may store received power so that the electronic device 1200 may operate without connection to an external power source for an extended period of time, which may range from several hours to several days.

In some embodiments, the electronic device 1200 includes one or more input devices 1218. The input device 1218 is a device that is configured to receive input from a user or the environment. The input device 1218 may include, for example, a push button, a touch-activated button, a capacitive touch sensor, a touch screen (e.g., a touch-sensitive display or a force-sensitive display), a capacitive touch button, dial, crown, or the like. In some embodiments, the input device 1218 may provide a dedicated or primary function, including, for example, a power button, volume buttons, home buttons, scroll wheels, and camera buttons.

The device 1200 may also include one or more sensors or sensor modules 1220, such as a force sensor, a capacitive sensor, an accelerometer, a barometer, a gyroscope, a proximity sensor, a light sensor, or the like. In some cases, the device 1200 includes a sensor array (also referred to as a sensing array) which includes multiple sensors 1220. For example, a sensor array associated with a protruding feature of a cover member may include an ambient light sensor, a Lidar sensor, and a microphone. As previously discussed with respect to FIG. 1B, one or more cameras modules may also be associated with the protruding feature. The sensors 1220 may be operably coupled to processing circuitry. In some embodiments, the sensors 1220 may detect deformation and/or changes in configuration of the electronic device and be operably coupled to processing circuitry that controls the display based on the sensor signals. In some implementations, output from the sensors 1220 is used to reconfigure the display output to correspond to an orientation or folded/unfolded configuration or state of the device. Example sensors 1220 for this purpose include accelerometers, gyroscopes, magnetometers, and other similar types of position/orientation sensing devices. In addition, the sensors 1220 may include a microphone, acoustic sensor, light sensor (including ambient light, infrared (IR) light, ultraviolet (UV) light, optical facial recognition sensor, a depth measuring sensor (e.g., a time of flight sensor), a health monitoring sensor (e.g., an electrocardiogram (erg) sensor, a heart rate sensor, a photoplethysmogram (ppg) sensor, a pulse oximeter, a biometric sensor (e.g., a fingerprint sensor), or other types of sensing device.

In some embodiments, the electronic device 1200 includes one or more output devices 1204 configured to provide output to a user. The output device 1204 may include display 1208 that renders visual information generated by the processor 1206. The output device 1204 may also include one or more speakers to provide audio output. The output device 1204 may also include one or more haptic devices that are configured to produce a haptic or tactile output along an exterior surface of the device 1200.

The display 1208 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1208 is a liquid-crystal display or an electrophoretic ink display, the display 1208 may also include a backlight component that can be controlled to provide variable levels of display brightness. If the display 1208 is an organic light-emitting diode or an organic electroluminescent-type display, the brightness of the display 1208 may be controlled by modifying the electrical signals that are provided to display elements. In addition, information regarding configuration and/or orientation of the electronic device may be used to control the output of the display as described with respect to input devices 1218. In some cases, the display is integrated with a touch and/or force sensor in order to detect touches and/or forces applied along an exterior surface of the device 1200.

The electronic device 1200 may also include a communication port 1212 that is configured to transmit and/or receive signals or electrical communication from an external or separate device. The communication port 1212 may be configured to couple to an external device via a cable, adaptor, or other type of electrical connector. In some embodiments, the communication port 1212 may be used to couple the electronic device 1200 to a host computer.

The electronic device 1200 may also include at least one accessory 1216, such as a camera, a flash for the camera, or other such device. The camera may be part of a camera array or sensing array that may be connected to other parts of the electronic device 1200 such as the control circuitry 1210.

As used herein, the terms "about," "approximately," "substantially," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

As used herein, the phrase "one or more of" or "at least one of" or" preceding a series of items, with the term "and" or "or" to separate any of the items, modifies the list as a whole, rather than each member of the list. The phrase "one or more of" or "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "one or more of A, B, and C" or "one or more of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
    an enclosure comprising:
        an enclosure component defining a side surface of the enclosure;
        a front cover assembly coupled to the enclosure component and comprising a front cover member formed from a first glass ceramic material, the front cover member having:
            an average transmission greater than or equal to 80% for visible light;
            a haze value less than 1%; and
            an average transmission greater than or equal to 85% for infrared light in a wavelength range from 900 nm to 1.6 micrometers; and
        a rear cover assembly coupled to the enclosure component and comprising a rear cover member formed from a second glass ceramic material, the second glass ceramic material having a dielectric constant less than 30;
    a display positioned below the front cover member;
    a front-facing biometric sensor assembly positioned below the front cover member, the front-facing biometric sensor assembly including:
        an infrared emitter module configured to operate through the front cover member; and
        an infrared image sensor configured to operate through the front cover member; and
    a transceiver component of a wireless communication system positioned below the rear cover assembly.

2. The electronic device of claim 1, wherein:
    the transceiver component is a directional antenna configured to transmit wireless signals at a frequency band between about 25 GHz and 39 GHz; and
    the dielectric constant of the second glass ceramic material ranges from 4 to 8 over a frequency range from 5 GHz to 40 GHz.

3. The electronic device of claim 2, wherein:
    the directional antenna is a first directional antenna;
    the frequency band is a first frequency band;
    the electronic device further comprises a second directional antenna positioned below the front cover assembly and configured to transmit wireless signals at a second frequency band between about 25 GHz and 39 GHz; and
    the first glass ceramic material has a dielectric constant ranging from 4 to 8 over the frequency range from 5 GHz to 40 GHz.

4. The electronic device of claim 1, wherein:
    the rear cover member defines a protruding region having a raised plateau surface and an array of openings extending into the raised plateau surface; and
    the electronic device further comprises a rear sensing array including an array of camera modules, each camera module of the array of camera modules positioned in a respective opening of the array of openings.

5. The electronic device of claim 4, wherein the rear sensing array further comprises an infrared sensor module configured to estimate a distance between the electronic device and an object.

6. The electronic device of claim 1, wherein:
    the front cover member has a color characterized by an a* value having a magnitude less than 1 and by a b* value having a magnitude less than 2; and
    the haze value is less than or equal to 0.2%.

7. The electronic device of claim 1, wherein:
    the front cover member defines an opening over a speaker;
    the infrared emitter module projects a spatial pattern of the infrared light; and
    the infrared image sensor is configured to produce an image from a reflection of the infrared light.

8. An electronic device comprising:
    a display;
    a front-facing biometric sensor assembly comprising:
        an emitter module configured to emit an optical signal in an infrared range from 900 nm to 1.6 microns; and a receiver module configured to detect a reflection of the optical signal and comprising an image sensor; and an enclosure comprising:
- an enclosure component;
- a front cover assembly coupled to the enclosure component and comprising a glass ceramic cover member positioned over the display and the front-facing biometric sensor assembly, the glass ceramic cover member having:
  - a haze value less than 0.5%; and
  - greater than or equal to 85% average transmission over the infrared range; and
- a rear cover assembly coupled to the enclosure component and including a cover member comprising a translucent portion.

9. The electronic device of claim 8, wherein:
the electronic device further comprises a rear-facing camera array comprising an array of camera modules;
the rear cover assembly defines an array of through-holes; and
each camera module of the array of camera modules extends into a respective through-hole of the array of through-holes.

10. The electronic device of claim 9, wherein the rear cover assembly further comprises at least one transparent window member coupled to the cover member and positioned over at least one through-hole of the array of through-holes.

11. The electronic device of claim 8, wherein:
the glass ceramic cover member of the front cover assembly is formed of a first glass ceramic material; and
the cover member of the rear cover assembly is formed of a second glass ceramic material different from the first glass ceramic material.

12. The electronic device of claim 11, wherein the translucent portion of the cover member of the rear cover assembly includes a first crystal size at an exterior surface region and a second crystal size, larger than the first crystal size, in an interior region.

13. The electronic device of claim 8, wherein the glass ceramic cover member has a thickness from 250 microns to 1.5 mm.

14. The electronic device of claim 8, wherein a portion of the glass ceramic cover member positioned over the display has a greater than or equal to 85% transmission for visible light.

15. An electronic device comprising:
a display;
a sensing array including a biometric sensor assembly, the biometric sensor assembly comprising at least one infrared light-emitting module and at least one infrared image sensor; and
an enclosure comprising:
- an enclosure component defining a side surface of the electronic device; and
- a cover assembly defining a front surface of the electronic device, the cover assembly comprising a cover member positioned over the display and the sensing array, formed from a glass ceramic material, and having:
  - an average transmission that is greater than or equal to 85% for visible light over a range from 400 nm to 700 nm;
  - an average transmission that is greater than or equal to 85% for light over a range from 900 nm to 1.6 microns;
  - a haze value less than 0.5%; and
  - a color described by an L* value of 90 or more, an a* value having a magnitude less than 0.5, and a b* value having a magnitude less than 1.

16. The electronic device of claim 15, wherein:
the cover assembly is a first cover assembly, the cover member is a first cover member, and the glass ceramic material is a first glass ceramic material;
the enclosure component defines an opening along the side surface;
the electronic device further comprises a second cover assembly including a second cover member formed from a second glass ceramic material and positioned within the opening; and
the electronic device comprises a directional antenna assembly positioned below the second cover assembly and configured to transmit wireless signals at a frequency band between about 25 GHz and 39 GHz.

17. The electronic device of claim 16, wherein:
the enclosure further comprises a third cover assembly defining a rear surface of the electronic device;
the third cover assembly comprises a third cover member formed from a third glass ceramic material; and
the electronic device further comprises a wireless charging component positioned below the third cover member.

18. The electronic device of claim 17, wherein each of the first glass ceramic material, the second glass ceramic material, and the third glass ceramic material has a dielectric constant from 2 to 20 in an RF frequency band.

19. The electronic device of claim 17, wherein each of the first glass ceramic material, the second glass ceramic material, and the third glass ceramic material comprises at least 10% by weight of one or more crystalline phases.

20. The electronic device of claim 15, wherein the cover member is chemically strengthened to form a compressive stress layer along a front surface of the cover member.

* * * * *